United States Patent
Lu et al.

(10) Patent No.: US 11,028,297 B2
(45) Date of Patent: Jun. 8, 2021

(54) DUAL CURE ADHESIVE COMPOSITION AND METHODS FOR ITS PREPARATION AND USE

(71) Applicant: Dow Silicones Corporation, Midland, MI (US)

(72) Inventors: Gang Lu, Auburn, MI (US); Nick Shephard, Auburn, MI (US); Ryan Thomas, Auburn, MI (US); Matthew Olsen, Wilmington, DE (US)

(73) Assignee: Dow Silicones Corporation, Midland, MI (US)

( * ) Notice: Subject to any disclaimer, the term of this patent is extended or adjusted under 35 U.S.C. 154(b) by 0 days.

(21) Appl. No.: 16/621,756

(22) PCT Filed: Aug. 21, 2018

(86) PCT No.: PCT/US2018/047125
§ 371 (c)(1),
(2) Date: Dec. 12, 2019

(87) PCT Pub. No.: WO2019/040383
PCT Pub. Date: Feb. 28, 2019

(65) Prior Publication Data
US 2020/0208033 A1 Jul. 2, 2020
US 2021/0002532 A9 Jan. 7, 2021

Related U.S. Application Data

(60) Provisional application No. 62/548,558, filed on Aug. 22, 2017.

(51) Int. Cl.
| | | |
|---|---|---|
| C08G 77/18 | (2006.01) | |
| C09J 183/14 | (2006.01) | |
| C08G 77/08 | (2006.01) | |
| C08G 77/16 | (2006.01) | |
| C08G 77/48 | (2006.01) | |
| C08K 5/14 | (2006.01) | |
| C08K 5/23 | (2006.01) | |
| C08K 5/57 | (2006.01) | |

(52) U.S. Cl.
CPC ............ *C09J 183/14* (2013.01); *C08G 77/08* (2013.01); *C08G 77/16* (2013.01); *C08G 77/18* (2013.01); *C08G 77/48* (2013.01); *C08K 5/14* (2013.01); *C08K 5/23* (2013.01); *C08K 5/57* (2013.01)

(58) Field of Classification Search
CPC ........ C09J 183/14; C08G 77/18; C08G 77/12; C08G 77/20; C08G 77/08; C08G 77/50
See application file for complete search history.

(56) References Cited

U.S. PATENT DOCUMENTS

| | | |
|---|---|---|
| 2,676,182 A | 4/1954 | Daudt |
| 3,159,601 A | 12/1964 | Ashby |
| 3,220,972 A | 11/1965 | Lamoreaux |
| 3,296,291 A | 1/1967 | Chalk |
| 3,419,593 A | 12/1968 | Willing |
| 3,516,946 A | 6/1970 | Modic |
| 3,814,730 A | 6/1974 | Karstedt |
| 3,989,668 A | 11/1976 | Lee et al. |
| 4,584,355 A | 4/1986 | Blizzard et al. |
| 4,585,836 A | 4/1986 | Homan et al. |
| 4,591,622 A | 5/1986 | Blizzard et al. |
| 4,766,176 A | 8/1988 | Lee et al. |
| 4,784,479 A | 11/1988 | Ikemori |
| 5,017,654 A | 5/1991 | Togashi et al. |
| 5,036,117 A | 7/1991 | Chung et al. |
| 5,175,325 A | 12/1992 | Brown et al. |
| 6,388,119 B1 | 5/2002 | Bauer et al. |
| 7,208,618 B2 | 4/2007 | Kornek et al. |
| 7,884,225 B2 | 2/2011 | Guennouni et al. |
| 7,956,210 B2 | 6/2011 | Bauer et al. |
| 8,304,543 B2 | 11/2012 | Jialanella et al. |
| 9,156,948 B2 | 10/2015 | Brandstadt et al. |
| 2016/0009865 A1 | 1/2016 | Jiang et al. |
| 2016/0032060 A1* | 2/2016 | Jiang ...................... C09K 5/14 427/387 |

FOREIGN PATENT DOCUMENTS

| | | |
|---|---|---|
| DE | 10232663 | 10/2003 |
| DE | 102005030581 | 1/2007 |
| EP | 0347895 | 12/1989 |
| EP | 1156052 | 11/2001 |
| EP | 1201671 | 5/2002 |
| EP | 1633761 | 3/2006 |
| WO | 2008107332 | 9/2008 |
| WO | 2014124378 | 8/2014 |
| WO | 2014124388 | 8/2014 |

* cited by examiner

*Primary Examiner* — Kuo Liang Peng
(74) *Attorney, Agent, or Firm* — Catherine U. Brown

(57) ABSTRACT

A dual cure (condensation and free radical reaction) adhesive composition is useful for electronics applications.

14 Claims, No Drawings

DUAL CURE ADHESIVE COMPOSITION AND METHODS FOR ITS PREPARATION AND USE

CROSS REFERENCE TO RELATED APPLICATIONS

This application is a U.S. national stage filing under 35 U.S.C. § 371 of PCT Application No. PCT/US18/047125 filed on 21 Aug. 2018, currently pending, which claims the benefit of U.S. Provisional Patent Application No. 62/548,558 filed 22 Aug. 2017 under 35 U.S.C. § 119 (e). PCT Application No. PCT/US18/047125 and U.S. Provisional Patent Application No. 62/548,558 are hereby incorporated by reference.

TECHNICAL FIELD

An adhesive composition is disclosed. The adhesive composition has a dual (radical and condensation) cure system. The adhesive composition contains a clustered functional polyorganosiloxane and poly-alkoxy functional polyorganosiloxane starting materials.

BACKGROUND (Meth)acrylic free radical curable compositions often suffer from the drawback that the bulk cures faster than the open-to-air surface, which leads to uncured or under-cured liquid-like layers. The underlying mechanism is thought to be that oxygen in air can quench the propagation of the free radicals, resulting in physical retardation of the crosslinking on the surface. Generally, polymeric (meth)acrylates may be more susceptible to oxygen inhibition than small molecule (meth)acrylates. Compared to methacrylates, acrylates may be more prone to oxygen inhibition.

Commercially available (meth)acrylic adhesives may employ silanol condensation cure to mitigate oxygen inhibition. A dual cure system comprising both free-radical cure and silanol-based condensation cure has been proposed. In this system, oxygen inhibition was lessened to certain extent, but was still unsatisfactory. To introduce alkoxysilyl groups, the condensation cure component contained silicone resins treated with trimethoxysilylethyl tetramethyldisiloxane (also known as ETM converter).

Traditionally, ETM converter is synthesized via Pt-catalyzed hydrosilylation. In the reaction scheme shown below, hydrosilylation reaction of vinyltrimethoxysilane with 1,1,3,3-tetramethyldisiloxane using a platinum catalyst yields ETM converter as a mixture including the α-adduct branched isomer and β-adduct linear isomer as reaction products.

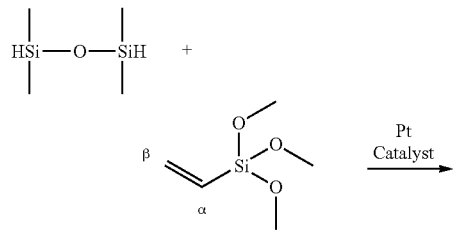

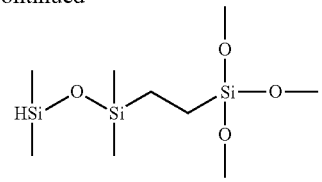

beta-adduct

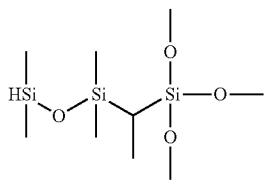

alpha-adduct

However, this method suffers from the drawback that selectivity results in a 65/35 mole ratio of β-adduct/α-adduct. In addition, without prompt removal or deactivation of the Pt catalyst, "over hydrosilylation" will occur, leading to side products in which both hydrogen atoms on the hydrogen terminated organosiloxane oligomer have reacted with a vinyltrimethoxysilane molecule, i.e., aa adduct, αβ adduct, βα adduct, and/or ββ adduct.

Adhesives containing silicone resins and polymers endblocked with ETM converter made via the route described above still exhibited unsatisfactory surface wetness and/or cure speed for some applications. There is an industry need for improved adhesive compositions that cure to form adhesives with faster cure speeds, improved surface cure, or both.

SUMMARY

An adhesive composition comprises:
A) a poly(meth)acrylate clustered functional polyorganosiloxane,
B) a poly-alkoxy endblocked resin-polymer blend,
C) a condensation reaction catalyst, and
D) a free radical initiator.

DETAILED DESCRIPTION

Starting Material A)

In the adhesive composition described above, A) the poly(meth)acrylate clustered functional polyorganosiloxane comprises units of formulae:
$(R_2R^1SiO_{1/2})_{aa}(RR^1SiO_{2/2})_{bb}(RSiO_{2/2})_{cc}(RSiO_{3/2})_{dd}$
$(SiO_{4/2})_{ee}((R_{ff})O_{(3-ff)/2}SiD^1SiR_{ff}O_{(3-ff)/2})_{gg}$, where each $D^1$ independently represents a divalent hydrocarbon group of 2 to 18 carbon atoms; each R independently represents a monovalent hydrocarbon group of 1 to 18 carbon atoms or a monovalent halogenated hydrocarbon group of 1 to 18 carbon atoms, each $R^1$ independently represents a methacryl-functional alkyl group or an acryl-functional alkyl group, subscript aa≥0, subscript bb≥0, a quantity (aa+bb)≥4, subscript cc>0, subscript dd≥0, subscript ee≥0, subscript ff is 0, 1, or 2, subscript gg≥2.

Each R is independently a monovalent hydrocarbon group (as defined hereinbelow), or a monovalent halogenated hydrocarbon group (as defined herein below). Monovalent hydrocarbon groups and monovalent halogenated hydrocarbon groups may have 1 to 18 carbon atoms. Suitable monovalent hydrocarbon groups for R include, but are not limited to, alkyl and aryl groups. Suitable alkyl groups are exemplified by methyl, ethyl, propyl, butyl and hexyl. Suitable aryl groups are exemplified by phenyl, tolyl, xylyl, and phenyl-methyl.

Each $R^1$ independently represents a methacryl-functional alkyl group or an acryl-functional alkyl group. Suitable groups for $R^1$ include methyl methacrylate, methyl acrylate, butyl methacrylate, 2-ethylhexylacrylate, and 2-ethylhexylmethacrylate.

Each $D^1$ independently represents a divalent hydrocarbon group of 2 to 18 carbon atoms. Alternatively, each $D^1$ may be selected from alkylene such as ethylene or propylene, arylene such as phenylene, or alkaralkylene. Alternatively, each $D^1$ may be an alkylene group such as ethylene or propylene.

In the unit formula above, subscript aa≥0, subscript bb≥0, a quantity (aa+bb)≥4, subscript cc>0, subscript dd≥0, subscript ee≥0, subscript ff is 0, 1, or 2, subscript gg≥2. Alternatively, the quantity (aa+bb) may be ≥6. Alternatively, the quantity (aa+bb) may be ≥8. By the term "poly(meth) acrylate clustered functional siloxane", it is meant that the siloxane has a linear or branched siloxane backbone structure and in the terminal and/or pendent positions of the siloxane there are methacrylate or acrylate functional groups spatially close to each other. The siloxane has at least 4 total methacrylate plus acrylate functional groups and at least two of them are in close proximity to each other, i.e., they are "clustered".

Alternatively, A) the poly(meth)acrylate clustered functional polyorganosiloxane may have formula:

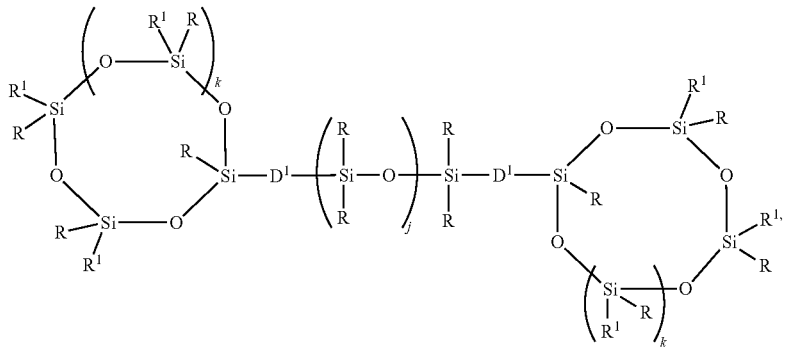

where R, $R^1$, and $D^1$ are as described above. Subscript j is 0 to 2,000,000, and each subscript k is independently 1 to 12 (i.e., such that each ring has 4 to 15 silicon atoms). Alternatively, subscript j is 5 to 500,000, alternatively 5 to 100,000, alternatively 5 to 50,000, alternatively 10 to 50,000, alternatively 10 to 10,000, alternatively 10 to 5,000, alternatively 20 to 2,000. Alternatively subscript k is 1 to 8, alternatively 1 to 6, alternatively 1 to 4, alternatively 1 to 2, and alternatively, k=1. Alternatively, A) the poly(meth) acrylate clustered functional polyorganosiloxane may have formula:

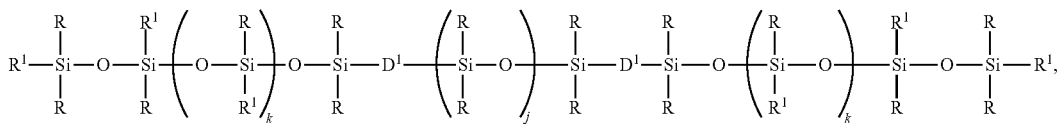

where R, $R^1$, $D^1$, and subscripts j and k are as described above.

Poly(meth)acrylate clustered functional polyorganosiloxanes may be prepared by known methods, such as disclosed in U.S. Patent Application Publication 2016/0009865. The poly(meth)acrylate clustered functional polyorganosiloxane used herein may be a hydrosilylation reaction product of starting materials comprising:

a) a polyorganosiloxane having an average of at least two silicon bonded aliphatically unsaturated groups per molecule;

b) an organohydrogensiloxane having an average of 4 to 15 silicon atoms per molecule, where starting material b) has silicon bonded hydrogen atoms;

with the proviso that a molar ratio of aliphatically unsaturated groups in starting material a) to silicon bonded hydrogen atoms in starting material b) is 1 to 3 to 1 to 20; and c) a reactive species having, per molecule, at least one aliphatically unsaturated group and one or more radical curable groups selected from acrylate functional groups and methacrylate functional groups.

Starting Material B)

Starting material B) in the adhesive composition described above is a poly-alkoxy endblocked resin-polymer blend. The poly-alkoxy endblocked resin-polymer blend comprises a reaction product of i) a siloxane resin comprising units of formulae $(R^{2'}_3SiO_{1/2})$ and $(SiO_{4/2})$, where each $R^{2'}$ is independently a monovalent hydrocarbon group, with the proviso that at least one $R^{2'}$ per molecule has terminal aliphatic unsaturation, wherein the siloxane resin has a molar ratio of $(R^{2'}_3SiO_{1/2})$ units (M units) to $(SiO_{4/2})$ units (Q units) ranging from 0.5:1 to 1.5:1 (M:Q ratio), ii) a polydiorganosiloxane comprising units of formulae $(R^{2'}_3SiO_{1/2})_{ii}$ and $(R_2SiO_{2/2})_{hh}$ (D units), where subscript hh is 20 to 1000 and subscript ii has an average value of 2, and iii) an alkoxy-functional organohydrogensiloxane oligomer. The alkoxy-functional organohydrogensiloxane oligomer has unit formula

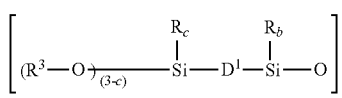

$^m(HR_2SiO_{1/2})_n(R_3SiO_{1/2})_f(HRSiO_{2/2})_o(R_2SiO_{2/2})_h$
$(RSiO_{3/2})_i(HSiO_{3/2})_p(SiO_{4/2})_{kk}$, where R and $D^1$ are as described above, each $R^3$ is independently a monovalent hydrocarbon group as described above for R, subscript b is 0 or 1, subscript c is 0, subscripts f, h, i, and k have values such that 5≥f≥0, 5≥h≥0, subscript i is 0 or 1, subscript kk is 0 or 1, subscript m>0, and a quantity (m+n+f+o+h+i+p+kk)≤50, with the proviso that >90 mol % of all D groups in the endblocker are linear; and iv) a hydrosilylation reaction catalyst.

Starting Material i)

The siloxane resin used to prepare starting material B) is i) a siloxane resin comprising units of formulae $(R^{2'}_3SiO_{1/2})$ and $(SiO_{4/2})$, where each $R^{2'}$ is independently a monovalent hydrocarbon group, with the proviso that at least one $R^{2'}$ per molecule has terminal aliphatic unsaturation, where the siloxane resin has a molar ratio of $(R^{2'}_3SiO_{1/2})$ units (M units) to $(SiO_{4/2})$ units (Q units) ranging from 0.5:1 to 1.5:1 (M:Q ratio), Starting material i) may contain an average of 3 to 30 mole percent of aliphatically unsaturated groups, alternatively 0.1 to 30 mole percent, alternatively 0.1 to 5 mole percent, alternatively 3 to 100 mole percent. The aliphatically unsaturated groups for $R^{2'}$ may have 2 to 18 carbon atoms. The aliphatically unsaturated groups for $R^{2'}$ may be alkenyl groups, alkynyl groups, or a combination thereof. The mole percent of aliphatically unsaturated groups in the siloxane resin is the ratio of the number of moles of unsaturated group-containing siloxane units in the resin to the total number of moles of siloxane units in the resin, multiplied by 100. The remaining monovalent hydrocarbon groups for $R^{2'}$ may be, for example, alkyl or aryl groups of 1 to 18 carbon atoms.

Methods of preparing resins are known in the art. For example, resin may be prepared by treating a resin copolymer produced by the silica hydrosol capping process of Daudt, et al. with at least an alkenyl-containing endblocking reagent. The method of Daudt et al., is disclosed in U.S. Pat. No. 2,676,182.

The method of Daudt, et al. involves reacting a silica hydrosol under acidic conditions with a hydrolyzable triorganosilane such as trimethylchlorosilane, a siloxane such as hexamethyldisiloxane, or mixtures thereof, and recovering a copolymer having M units and Q units. The resulting copolymers generally contain from 2 to 5 percent by weight of hydroxyl groups.

The siloxane resin, which typically contains less than 2% of silicon-bonded hydroxyl groups, may be prepared by reacting the product of Daudt, et al. with an unsaturated organic group-containing endblocking agent and an endblocking agent free of aliphatic unsaturation, in an amount sufficient to provide from 3 to 30 mole percent of unsaturated organic groups in the final product. Examples of endblocking agents include, but are not limited to, silazanes, siloxanes, and silanes. Suitable endblocking agents are known in the art and exemplified in U.S. Pat. Nos. 4,584,355; 4,591,622; and 4,585,836. A single endblocking agent or a mixture of such agents may be used to prepare the siloxane resin used as starting material i).

Starting Material ii)

The polydiorganosiloxane used to prepare starting material B) comprises units of formulae $(R^{2'}_3SiO_{1/2})_{ii}$ and $(R_2SiO_{2/2})_{hh}$ (D units), where R and $R^{2'}$ are as described above, subscript hh is 20 to 1000 and subscript ii has an average value of 2.

Alternatively, starting material ii) may comprise a polydiorganosiloxane of

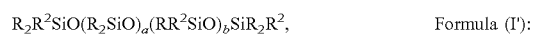   Formula (I'):

   Formula (I'I):

or a combination of both (I') and (II');
where R is as described above and each $R^2$ is independently a monovalent hydrocarbon group having terminal aliphatic unsaturation, as described above for $R^{2'}$. Subscript a may be 0 or a positive number. Alternatively, subscript a has an average value of at least 2. Alternatively subscript a may have a value ranging from 2 to 2000. Subscript b may be 0 or a positive number. Alternatively, subscript b may have an average value ranging from 0 to 2000. Subscript c may be 0 or a positive number. Alternatively, subscript c may have an average value ranging from 0 to 2000. Subscript d has an average value of at least 2. Alternatively subscript d may have an average value ranging from 2 to 2000. Alternatively, each R is a monovalent hydrocarbon group exemplified by alkyl such as methyl and aryl such as phenyl. Alternatively, $R^2$ is exemplified by alkenyl groups such as vinyl, allyl, butenyl, and hexenyl; and alkynyl groups such as ethynyl and propynyl.

Starting material ii) may comprise a polydiorganosiloxane such as
i) dimethylvinylsiloxy-terminated polydimethylsiloxane,
ii) dimethylvinylsiloxy-terminated poly(dimethylsiloxane/methylvinylsiloxane),
iii) dimethylvinylsiloxy-terminated polymethylvinylsiloxane,
iv) trimethylsiloxy-terminated poly(dimethylsiloxane/methylvinylsiloxane),
v) trimethylsiloxy-terminated polymethylvinylsiloxane,
vi) dimethylvinylsiloxy-terminated poly(dimethylsiloxane/methylvinylsiloxane),
vii) dimethylvinylsiloxy-terminated poly(dimethylsiloxane/methylphenylsiloxane),
viii) dimethylvinylsiloxy-terminated poly(dimethylsiloxane/diphenylsiloxane),
ix) phenyl,methyl,vinyl-siloxy-terminated polydimethylsiloxane,
x) dimethylhexenylsiloxy-terminated polydimethylsiloxane,
xi) dimethylhexenylsiloxy-terminated poly(dimethylsiloxane/methylhexenylsiloxane),
xii) dimethylhexenylsiloxy-terminated polymethylhexenylsiloxane,
xiii) trimethylsiloxy-terminated poly(dimethylsiloxane/methylhexenylsiloxane),
xiv) trimethylsiloxy-terminated polymethylhexenylsiloxane
xv) dimethylhexenyl-siloxy terminated poly(dimethylsiloxane/methylhexenylsiloxane),
xvi) dimethylvinylsiloxy-terminated poly(dimethylsiloxane/methylhexenylsiloxane), or
xvii) a combination of two or more of i), ii) iii), iv), v), vi), vii), viii), ix), x), xi), xii), xiii) xiv), xv), and xvi).

Methods of preparing polydiorganosiloxanes suitable for use as starting material ii) to prepare starting material B), such as hydrolysis and condensation of the corresponding organohalosilanes or equilibration of cyclic polydiorganosiloxanes, are known in the art.

Starting Material iii)

Starting material iii) is an alkoxy-functional organohydrogensiloxane oligomer. Starting material iii) may be prepared by a method comprising
1) reacting starting materials comprising:
(a) a polyorganohydrogensiloxane oligomer of unit formula (I):
$(HR_2SiO_{1/2})_e(R_3SiO_{1/2})_f(HRSiO_{2/2})_g(R_2SiO_{2/2})_h(RSiO_{3/2})_i(HSiO_{3/2})_{jj}(SiO_{4/2})_{kk}$, where R is as described above, and subscripts e, f, g, h, i, jj, and kk have values such that 5≥e≥0, 5≥f≥0, 10≥g≥0, 5≥h≥0, subscript i is 0 or 1, 5≥jj≥0, subscript kk is 0 or 1, with the proviso that a quantity (e+g+jj)≥2, and a quantity (e+f+g+h+i+jj+kk)≤50;
(b) an aliphatically unsaturated alkoxysilane of formula (II):
$R^2(R_c)Si(OR^3)_{(3-c)}$, where R and $R^2$ are as described above, each R3 is independently a monovalent hydrocarbon group of 1 to 8 carbon atoms, and subscript c is 0 or 1; and
(c) a selective hydrosilylation catalyst; and optionally 2) isolating the alkoxy-functional organohydrogensiloxane oligomer prepared in step 1).

Ingredient (a) useful in the method for making iii) the alkoxy-functional organohydrogensiloxane oligomer described above is a polyorganohydrogensiloxane oligomer of unit formula (III):
$(HR_2SiO_{1/2})_e(R_3SiO_{1/2})_f(HRSiO_{2/2})_g(R_2SiO_{2/2})_h(RSiO_{3/2})_i(HSiO_{3/2})_{jj}(SiO_{4/2})_{kk}$, where R is as described above, subscripts e, f, g, h, i, jj, and kk have values such that 5≥e≥0, 5≥f≥0, 10≥g≥0, 5≥h≥0, subscript i is 0 or 1, 5≥jj≥0, subscript kk is 0 or 1, with the proviso that a quantity (e+g+jj)≥2, and a quantity (e+f+g+h+i+jj+kk)≤50.

In an alternative embodiment, ingredient (a) is an α,γ-hydrogen terminated organohydrogensiloxane oligomer of formula (IV):

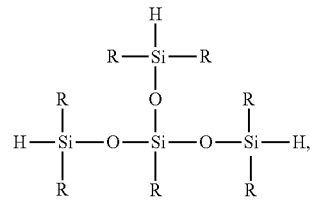

where each R is independently an alkyl group of 1 to 6 carbon atoms, an aryl group of 6 to 10 carbon atoms, a halogenated alkyl group of 1 to 6 carbon atoms, or a halogenated aryl group of 6 to 10 carbon atoms; and subscript a is an integer up to 20. Alternatively, subscript a is 0 to 20, alternatively subscript a is 0 to 10; alternatively subscript a is 0 to 5; and alternatively subscript a is 0 or 1. Alternatively, subscript a may be 2 to 10; alternatively subscript a is 2 to 5. Examples of suitable organohydrogensiloxane oligomers include 1,1,3,3,5,5-hexamethyltrisiloxane, 1,1,3,3-tetramethyldisiloxane, 1,1,3,3,5,5-hexaethyltrisiloxane, and 1,1,3,3-tetraethyldisiloxane. Alternatively, ingredient (a) may be 1,1,3,3-tetramethyldisiloxane.

When the organohydrogensiloxane oligomer of formula (IV) is used in the method, the product comprises an alkoxy-functional organohydrogensiloxane oligomer produced of formula (V):

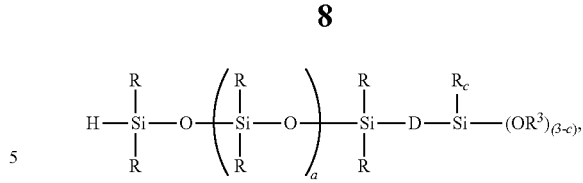

where R and subscripts a and c are as described above, D is a divalent hydrocarbon group of 2 to 18 carbon atoms, with the proviso that >90 mol % of D are linear divalent hydrocarbon groups.

In an alternative embodiment, ingredient (a) the organohydrogensiloxane oligomer has unit formula (VI): $(HR_2SiO_{1/2})_3(R_2SiO_{2/2})_q(RSiO_{3/2})$, where subscript q is 0 to 3. The polyorganohydrogensiloxane oligomer of this unit formula may have formula (VII):

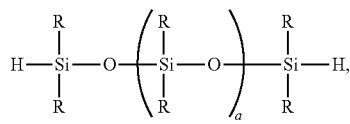

where R is as described above. Examples of such organohydrogensiloxane oligomers include siloxanes of formula $(Me_2HSiO_{1/2})_3(PrSiO_{3/2})$, where Me represents a methyl group and Pr represents a propyl group.

When the organohydrogensiloxane oligomer used for ingredient (a) in the method described above has unit formula (VI), the product comprises an alkoxy-functional organohydrogensiloxane oligomer of formula (VIII), where formula (VIII) is:

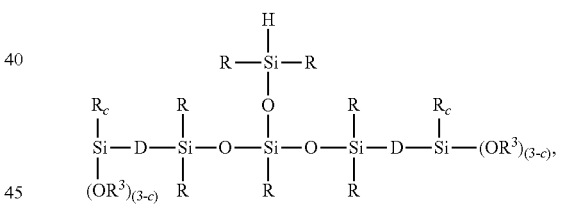

where R and subscript c are as described above, each D is independently a divalent hydrocarbon group of 2 to 18 carbon atoms, with the proviso that >90 mol % of D are linear divalent hydrocarbon groups.

In an alternative embodiment of the invention, ingredient (a) the organohydrogensiloxane oligomer may have unit formula (IX):
$(HR_2SiO_{1/2})_2(R_2SiO_{2/2})_q(HRSiO_{2/2})_r$, where R is as described above, subscript q is 0 to 3, and subscript r is 0 to 3. In this embodiment, the organohydrogensiloxane oligomer may have formula (X):

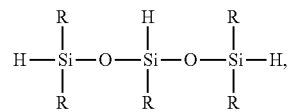

where R is as described above. Examples of such organohydrogensiloxane oligomers include 1,1,3,5,5-pentamethyltrisiloxane. In this embodiment, the product comprises an alkoxy-functional organohydrogensiloxane oligomer of formula (XI), formula (XII), or a combination thereof, where formula (XI) is

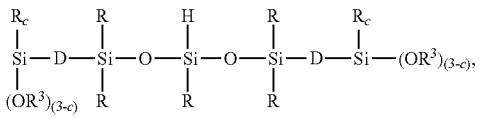

and formula (XII) is

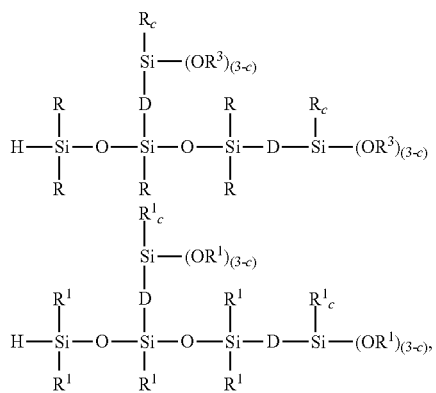

where R and subscript c are as described above.

In an alternative embodiment ingredient a) the organohydrogensiloxane oligomer is cyclic. The cyclic organohydrogensiloxane oligomer may have unit formula: $(R_2SiO_{2/2})_v$ $(RHSiO_{2/2})_s$, where R is as described above, subscript $s \geq 3$, and subscript $v \geq 0$. Alternatively, subscript s may be 3 to 14; alternatively 3 to 9, alternatively 3 to 6, alternatively 3 to 5, and alternatively 4. Alternatively, subscript v may be 0 to 14; alternatively 0 to 9, alternatively 0 to 6, alternatively 0 to 5, and alternatively 0. When this cyclic organohydrogensiloxane oligomer is used as ingredient (a), then the product may comprises an alkoxy-functional organohydrogensiloxane oligomer of unit formula: $(R_2SiO_{2/2})_v(RHSiO_{2/2})_t$

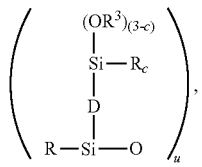

where R, $R^3$, D, and subscripts c and v are as described above, subscript t is 0 or more, subscript u is 1 or more, and a quantity (t+u)=s.

Ingredient (b) useful in the method described above is an aliphatically unsaturated alkoxysilane of formula (II): $R^2(R_c)Si(OR^3)_{(3-c)}$, where R, $R^2$, and $R^3$ and subscript c are as described above. Alternatively, each $R^3$ may be a monovalent hydrocarbon group of 1 to 12 carbon atoms, alternatively 1 to 6 carbon atoms, alternatively 1 to 4 carbon atoms, and alternatively 1 to 2 carbon atoms. Alternatively, each R3 may be methyl.

Ingredient (b) may comprise an aliphatically unsaturated alkoxysilane exemplified by a dialkoxysilane, such as a dialkenyldialkoxysilane; a trialkoxysilane, such as an alkenyltrialkoxysilane; or a combination thereof. Examples of suitable aliphatically unsaturated alkoxysilanes include vinyltrimethoxysilane, allyltriethoxysilane, allyltrimethoxysilane, vinyltriethoxysilane, hexenyltrimethoxysilane, vinylmethyldimethoxysilane, hexenylmethyldimethoxysilane, hexenyltriethoxysilane, and a combination thereof, and alternatively vinyltrimethoxysilane.

Ingredient (a) and ingredient (b) are present in relative molar amounts of ingredient (a):ingredient (b) of 1:1 to >1:1, alternatively greater than or equal to 1, i.e., (a):(b) ratio≥1:1. Alternatively, (a):(b) ratio may range from 5:1 to 1:1, alternatively 2:1 to 1:1; and alternatively 1.5:1 to 1:1. Without wishing to be bound by theory, it is thought that a molar excess of ingredient (a) relative to ingredient (b) may favorably affect yield in the product.

Ingredient (c) useful in the method to prepare starting material iii) is a selective hydrosilylation catalyst. In one embodiment, ingredient (c) is a cobalt complex. The cobalt complex has formula: $[Co(R^5)_x(R^6)_y(R^7)_w]_z$, where a quantity (w+x+y)=4 and subscript z is 1 to 6. Each $R^5$ is a ligand selected from carbon monoxide (CO), an isonitrile ($CNR^8$), a cyanoalkyl (NCO), $NO^+$ (called a nitrosyl or nitrosonium) or cyano ($CN^-$), where each $R^8$ is independently an alkyl group of 1 to 18 carbon atoms. The positively charged nitrosyl ligand for $R^5$ renders the catalyst positively charged. When R5 is positively charged, a negatively charged counteranion will be present, such as a halogen atom (e.g., Cl or Br), tetrafluoroborate, hexafluorophosphate, or triflate. The negatively charged cyano ligand renders the catalyst negatively charged. When $R^5$ is negatively charged, a positively charged counter cation is present, such as sodium, potassium, tetrabutylammonium, or bis(triphenylphosphine) iminium.

Each $R^6$ is independently a phosphine ligand exemplified by a diphenyl-bisphosphino alkane ligand, such as diphenylbisphosphinoethane (dppe) or diphenylbisphosphinomethane (dppm). When subscript y>0, then subscript z may be at least 2.

Each $R^7$ is a ligand, for example, an anionic ligand such as a halide (e.g., $Br^-$, or $Cl^-$), an alkoxide or related oxygenate ($OR^{8-}$, or acetyl acetonate), an amide ($NR^8_2^-$), an alkyl group of 1 to 18 carbon atoms, or a hydride ($H^-$). In some cases, the complex needs to be activated in order to remove this ligand. Halides could be activated by treatment with a hydride such as $Li[HBEt_3]$ where Et represents an ethyl group, or reduction with a silver salt or an alkali metal such as sodium or lithium. Alkoxides or amides may activated upon reaction with a hydrosilane (either separately or the hydrosilane in the catalytic reaction). For alkyl ligands (an anionic carbon ligand, such as $[CH_2SiMe_3]^-$, where Me represents a methyl group, or $Me^-$, or $butyl^-$) these may activate upon with the hydrosilane as well.

The hydride ligand is typically present in the active form of the catalyst. When $Co_2(CO)_8$ is used as the catalyst, it is expected to be activated in situ to form $Co(H)(CO)_4$.

When the cobalt complex is used, the method to make starting material iii) described herein may be performed at 1 atmosphere of pressure or higher. Alternatively, the method may be performed at 1 atmosphere to 1.5 atmosphere. Step 1) may be performed at 0° C. to 150° C., alternatively 20° C. to 150° C., alternatively 30° C. to 150° C., and alternatively 50° C. to 100° C. The temperature for heating in step 1) depends on various factors including the pressure selected, however, heating may be performed at least 20° C. to ensure the reaction proceeds quickly enough to be practical. The upper limit for temperature during heating is not critical and depends on the ingredients selected, i.e., the upper limit should be such that the ingredients do not vaporize out of the reactor selected for performing the method. Alternatively, heating may be from 250° C. to 150° C., alternatively 30° C. to 100° C. The exact temperature selected depends on various factors including the selection of ligands present on the catalyst. For example, when $Co_2(CO)_8$, is used, the reaction temperature may be lower, such as 0° C. to 50° C. When the catalyst includes a dppm or dppe ligand, this may impart improved storage stability to the catalyst and allow for higher reaction temperatures. For example, when the catalyst is $Co_2(CO)_6(dppm)$, it may be stored at room temperature, whereas $Co_2(CO)_8$ may decompose unless stored at low temperatures (typically <0° C.). Alternatively, ingredient (c) may be an iridium complex of formula: $[Ir(R^9)_{xx}(R^{10})_{yy}]_{zz}$, where subscript xx is 1 or 2, $R^9$ is a 1,5-cyclooctadiene ligand or a 2,5-norbornadiene ligand, subscript yy is 0 to 2, alternatively 0 or 1, $R^{10}$ is a ligand that can be activated, and subscript zz is 1 or 2. Alternatively, subscript zz=2. Activating with respect to $R^{10}$ may be performed by any convenient means, such as heating at a temperature less than the boiling point of the organohydrogensiloxane oligomer, adding a silver salt, or by photochemical or electrochemical means in step 1) of the method described herein. Examples of ligands suitable for $R^{10}$ include a halogen atom, a beta-ketoester ligand, a halogenated beta-ketoester ligand, an alkoxy ligand, a cyanoalkyl ligand, an aryl ligand, and a heteroaryl ligand. Examples of suitable halogen atoms include bromine (Br), chlorine (Cl) and iodine (I). Alternatively, the halogen atom may be Cl. Examples of beta-ketoester ligands include acetyl acetonate (acac). Examples of halogenated beta-ketoesters include hexafluoro acetylacetonate (hfacac). Examples of alkoxy ligands include methoxy, ethoxy, and propoxy. Alternatively the alkoxy ligand may be methoxy. Examples of suitable cyanoalkyl ligands include $CH_3CN$, acetonitrile, and tetrahydrofuran (THF). Examples of suitable aryl ligands include phenyl, benzyl, or indenyl. Examples of suitable heteroaryl ligands include pyridine.

Examples suitable iridium catalysts for ingredient (c) include, but are not limited to [Ir(I)CODCl-dimer, Ir(I)CODacac, Ir(I)COD$_2$BARF, Ir(I)COD(OMe)-dimer, Ir(I)COD(hfacac), Ir(I)COD(CH$_3$CN)$_2$, Ir(I)COD(pyridine), Ir(I)COD(indenyl), and mixtures thereof; wherein COD represents a 1,5-cyclooctadiene group, BARF represents tetrakis(3,5-bis(trifluoromethyl)phenyl)borate, acac represents acetyl acetonate, and hfacac represents hexafluoro acetylacetonate.

When the iridium complex is used, step 1) of the method for making starting material iii) may be performed in the presence of an oxidant, such as oxygen gas ($O_2$), an organic oxidant such as a quinone, or an inorganic oxidant such as an oxide (as described, for example, in DE102005030581). Alternatively, the stabilizer may be a diene or polyene added in excess to further stabilize the Ir catalyst to allow better overall performance (as described, for example in WO 2008107332 A1, EP1156052 B1, EP1633761 B1, EP1201671 B1, DE10232663 C1).

The method may be performed at 1 atmosphere of pressure or higher. Alternatively, the method may be performed at 1 atmosphere to 1.5 atmosphere. Step 1) may be performed at 0° C. to 150° C., alternatively 50° C. to 150° C., alternatively 60° C. to 150° C., and alternatively 50° C. to 100° C. The temperature for heating in step 1) depends on various factors including the pressure selected, however, heating may be performed at least 70° C. to ensure the reaction proceeds quickly enough to be practical. The upper limit for temperature during heating is not critical and depends on the ingredients selected, i.e., the upper limit should be such that the ingredients do not vaporize out of the reactor selected for performing the method. Alternatively, heating may be from 70° C. to 150° C., alternatively 70° C. to 100° C.

Alternatively, ingredient (c) may be a chelated rhodium diphosphine complex. The chelated rhodium diphosphine complex may have formula (c1): $[R^4(R^{11}_2P)_2RhR^{12}]_2$, formula (c2): $[R^4(R^{11}_2P)_2Rh(R^{14})]R^{13}$, or a mixture thereof. In each of formula (c1) and formula (c2), each $R^4$ is independently a divalent hydrocarbon group, each $R^{11}$ is independently a monovalent hydrocarbon group, and each $R^{12}$ is independently a negatively charged ligand, and each $R^{13}$ is independently an anion. The divalent hydrocarbon group for $R^4$ may be an alkylene group alkylene group of 1 to 6 carbon atoms. Alternatively, $R^4$ may be methylene, ethylene, or hexylene; and alternatively $R^4$ may be ethylene.

The monovalent hydrocarbon group for $R^{11}$ may be an alkyl group or an aryl group, as defined hereinbelow. Alternatively, the alkyl group for $R^{11}$ may be methyl, ethyl or propyl. Suitable aryl groups for $R^{11}$ are exemplified by, but not limited to, phenyl, tolyl, xylyl, benzyl, and 2-phenylethyl. Alternatively, 11 may be an ethyl group or a phenyl group.

Examples of negatively charged ligand suitable for $R^{12}$ include a halogen atom, an alkoxy ligand, an aryl ligand, and a heteroaryl ligand. Examples of suitable halogen atoms include bromine (Br), chlorine (Cl) and iodine (I). Alternatively, the halogen atom may be Cl. Examples of alkoxy ligands include methoxy, ethoxy, and propoxy. Alternatively the alkoxy ligand may be methoxy. Examples of suitable aryl ligands include phenyl, benzyl, or indenyl.

$R^{13}$ is an anion. Alternatively, the anion may be what is referred to by those skilled in the art as a 'weakly coordinating anion' or a 'non-coordinating anion', including perchlorate, trifluoromethylsulfonate, tetrafluoroborate, tetrakisphenylborate, tetrakis(pentafluorophenyl)borate, methyltris(pentafluorophenyl)borate, tetrakis(3,5-bis(trifluoromethyl)phenyl)borate, hexafluoroantimonate, hexafluorophosphate, $[Al(C(CF_3)_3)_4]^-$, carboranes such as $[HCB_{11}Me_5Br_6]^-$, (where Me represents a methyl group).

In formula (c2), $R^{14}$ represents a donor ligand. Appropriate donor ligands are nitriles such as acetonitrile, cyclized or non-cyclized ethers such as tetrahydrofuran or diethylether, dimethylsulfoxide, olefins such as 1,2-cis-cyclooctene or 1-octene or ethylene, dienes such as 1,5-cyclooctadiene or 2,5-norbornadiene or 1,5-hexadiene, ketones such as acetone, or alkynes such as acetylene or 1,2-diphenylacetylene.

Examples suitable rhodium catalysts for ingredient (c) include, but are not limited to [1,2-bis(diphenylphosphino)ethane]dichlorodirhodium and [1,2-bis(diethylphospino)ethane]dichlorodirhodium, and mixtures thereof.

When the rhodium catalyst is used for ingredient (c), the method for making starting material iii) may be performed under inert conditions, i.e., where the containers for the ingredients are purged with an inert gas, such as nitrogen, before the reaction. The oligomers used may be purified by contacting with basic $Al_2O_3$ to decrease acid concentration before step 1). The method may be performed at 1 atmosphere of pressure or higher. Alternatively, the method may be performed at 1 atmosphere to 1.5 atmosphere. Step 1) may be performed at 0° C. to 150° C., alternatively 50° C. to 150° C., alternatively 60° C. to 150° C., and alternatively 50° C. to 100° C. The temperature for heating in step 1)

depends on various factors including the pressure selected, however, heating may be performed at least 70° C. to ensure the reaction proceeds quickly enough to be practical. The upper limit for temperature during heating is not critical and depends on the ingredients selected, i.e., the upper limit should be such that the ingredients do not vaporize out of the reactor selected for performing the method. Alternatively, heating may be from 70° C. to 150° C., alternatively 70° C. to 100° C.

The amount of ingredient (c) used in step 1) of the method described above depends on various factors including the specific polyorganohydrogensiloxane oligomer selected for ingredient (a), the specific aliphatically unsaturated alkoxysilane selected for ingredient (b), and the temperature to which the mixture can be heated without boiling away the polyorganohydrogensiloxane oligomer selected for ingredient (a). However, the amount of ingredient (c) may be sufficient to provide a molar amount of cobalt metal in the mixture of 1 parts per million (ppm) to 100 ppm, alternatively 5 ppm to 80 ppm, alternatively 5 ppm to 20 ppm based on combined weights of ingredients (a) and (b). Without wishing to be bound by theory, it is thought that at catalyst loading toward the upper end of the range, yield may decrease due to gels forming as side products, but selectivity toward the compound of formula (IV) remains favorable. The method may optionally further comprise deactivation or removal of the catalyst. However, with appropriate catalyst loading, the step of deactivation or removal of the catalyst may be omitted.

Step 1) of the method described above produces a product comprising an alkoxy-functional organohydrogensiloxane oligomer. The alkoxy-functional organohydrogensiloxane oligomer has unit formula (X):

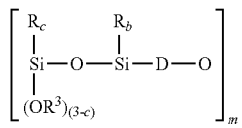

$(HR_2SiO_{1/2})_n(R_3SiO_{1/2})_f(HRSiO_{2/2})_o(R_2SiO_{2/2})_h$ $(RSiO_{3/2})_i(HSiO_{3/2})_p(SiO_{4/2})_{kk}$, where R, R³, and subscripts c, f, h, i, and kk are as described above, subscript b is 0 to 2, m>0, and a quantity (m+n+o+p)=(e+g+jj), and each D is independently a divalent hydrocarbon group of 2 to 18 carbon atoms, with the proviso that >90 mol % of all D groups produced in step 1) are linear. The method described herein provides the benefit that this alkoxy-functional organohydrogensiloxane oligomer is produced with high selectivity to the β-adduct compound, i.e., where D is linear, with either none or lower amounts of the corresponding α-adduct compound than existing methods using other catalysts.

The ingredients in step 1) of the method described above form a mixture, which may be homogeneous or heterogeneous. One or more additional ingredients, i.e., in addition to ingredients (a), (b), and (c) described above, may optionally be used in the method and composition described herein. The additional ingredient, when present, may be (d) a solvent or (e) a stabilizer, or both (d) and (e).

Ingredient (d) is a solvent that may be added to the mixture used in step 1) of the method described herein. One or more of ingredients (a), (b), and/or (c) may be provided in a solvent. For example, the ingredient (c) may be dissolved in a solvent that is added to the mixture in step 1). The solvent may facilitate contacting of reactants and catalyst, flow of the mixture and/or introduction of certain ingredients, such as the catalyst. Solvents used herein are those that help fluidize the ingredients of the mixture but essentially do not react with any of these ingredients. Solvents may be selected based on solubility the ingredients in the mixture and volatility. The solubility refers to the solvent being sufficient to dissolve ingredients of the mixture. Volatility refers to vapor pressure of the solvent. If the solvent is too volatile (having too high vapor pressure) the solvent may not remain in solution during heating. However, if the solvent is not volatile enough (too low vapor pressure) the solvent may be difficult to remove from the product or isolate from the alkoxy-functional organohydrogensiloxane oligomer.

The solvent may be an organic solvent. The organic solvent can be an aromatic hydrocarbon such as benzene, toluene, or xylene, or a combination thereof. Ingredient (d) may be one solvent. Alternatively, ingredient (d) may comprise two or more different solvents.

The amount of solvent can depend on various factors including the specific solvent selected and the amount and type of other ingredients selected for the mixture. However, the amount of solvent may range from 0% to 99%, or when present, 1% to 99%, and alternatively 2% to 50%, based on the weight of the mixture.

The method may optionally further comprise one or more additional steps. The method may further comprise a step of: recovering a fraction containing the alkoxy-functional organohydrogensiloxane oligomer from the product. Because the alkoxy-functional organohydrogensiloxane oligomer may comprise a β-adduct compound (i.e., where D is linear) and a corresponding α-adduct compound (i.e., where D is not linear) are difficult and/or costly to separate from one another, a fraction comprising both β-adduct compound and α-adduct compound may be recovered from the product after step 1) described above. It is desirable that this fraction contain >90% β-adduct compound, alternatively >90% to 100% β-adduct compound, alternatively 92% to 100%, alternatively >90% to <100%, alternatively 92% to <100%, and alternatively 95% to <100% β-adduct compound, based on the combined amounts of β-adduct compound and α-adduct compound in the fraction. Recovering this fraction may be performed by any convenient means, such as stripping or distillation, with heating or under vacuum, or a combination thereof.

The fraction described above comprising the β-adduct compound alkoxy-functional organohydrogensiloxane oligomer above is useful for functionalization of polyorganosiloxanes resins and polymers (e.g., starting materials i) and ii) described above) containing aliphatically unsaturated functionality. For example, a hydrosilylation reaction of the SiH group in the alkoxy-functional organohydrogensiloxane oligomer of formula (X) with an aliphatically unsaturated group bonded to silicon starting material i) and starting material ii) will produce an alkoxy-functional polyorganosiloxane resin polymer blend. This reaction is catalyzed by starting material iv).

Starting Material iv)

Starting material iv) is a hydrosilylation reaction catalyst other than the catalyst used in preparation of starting material iii). Conventional catalysts for catalyzing hydrosilylation reaction are suitable, are known in the art, and are commercially available. Such hydrosilylation catalysts can be a platinum group metal, such as platinum. Alternatively, the hydrosilylation catalyst may be a compound of such a metal, for example, chloroplatinic acid, chloroplatinic acid hexahydrate, platinum dichloride, and complexes of said compounds with low molecular weight organopolysiloxanes or platinum compounds microencapsulated in a matrix or core/shell type structure. Complexes of platinum with low molecular weight organopolysiloxanes include 1,3-diethenyl-1,1,3,3-tetramethyldisiloxane complexes with platinum. These complexes may be microencapsulated in a resin matrix. Exemplary hydrosilylation catalysts are described in U.S. Pat. Nos. 3,159,601; 3,220,972; 3,296,291; 3,419,593; 3,516,946; 3,814,730; 3,989,668; 4,784,879; 5,036,117; and 5,175,325 and EP 0 347 895 B. Microencapsulated hydrosilylation catalysts and methods of preparing them are known in the art, as exemplified in U.S. Pat. Nos. 4,766,176 and 5,017,654. Combining the starting materials may be performed at elevated temperature, such as heating at 50° C. to 250° C.

Starting Material C)

Starting material C) in the adhesive composition described above is a condensation reaction catalyst. The condensation reaction catalyst may be selected from common condensation catalysts that are effective for silanol-silanol condensation reaction, include organometallic compounds, amines, and a wide range of organic and inorganic bases and acids. Organometallic compounds include organic compounds of tin, titanium, zinc, zirconium, hafnium, and others. The condensation reaction catalysts can be an organotin compound and an organotitanium compound. Exemplary organotin compounds may be selected from the group consisting of: a) stannic salts of carboxylic acids such as i) dibutyl tin dilaurate, ii) dimethyl tin dilaurate, iii) di-(n-butyl)tin bis-ketonate, iv) dibutyl tin diacetate, v) dibutyl tin maleate, vi) dibutyl tin diacetylacetonate, vii) dibutyl tin dimethoxide, viii) carbomethoxyphenyl tin trisuberate, ix) dibutyl tin dioctanoate, x) dibutyl tin diformate, xi) isobutyl tin triceroate, xii) dimethyl tin dibutyrate, xiii) dimethyl tin di-neodeconoate, xiv) dibutyl tin di-neodeconoate, xv) triethyl tin tartrate, xvi) dibutyl tin dibenzoate, xvii) butyltintri-2-ethylhexanoate, xviii) dioctyl tin diacetate, xix) tin octylate, xx) tin oleate, xxi) tin butyrate, xxii) tin naphthenate, xxiii) dimethyl tin dichloride; b) tin (II) salts of organic carboxylic acids such as xxiv) tin (II) diacetate, xxv) tin (II) dioctanoate, xxvi) tin (II) diethylhexanoate, xxvii) tin (II) dilaurate, c) stannous salts of carboxylic acids such as xxviii) stannous octoate, xxix) stannous oleate, xxx) stannous acetate, xxxi) stannous laurate, xxxii) stannous stearate, xxxiii) stannous naphthanate, xxxiv) stannous hexanoate, xxxv) stannous succinate, xxxvi) stannous caprylate, and a combination of two or more of i) to xxxvi). Exemplary organotitanium compounds may be selected from the group consisting of: i) tetra-n-butyl titanate, ii) tetraisopropyl titanate, iii) tetra-t-butyl titanate, iv) tetrakis(2-ethylhexyl) titanate, v) acetylacetonate titanate chelate, vi) ethyl acetoacetate titanate chelate, vii) triethanolamine titanate chelate, and a combination of two or more of i), ii), iii), iv), v), vi) and vii).

The amount of condensation reaction catalyst in the adhesive composition depends on various factors including the selection of the other starting materials, whether any additional starting materials are added, and the end use of the adhesive composition. However, the condensation reaction catalyst may be present in an amount ranging from 0.01% to 25% based on combined weights of all starting materials in the adhesive composition. Alternatively, the condensation reaction catalyst may be present in an amount of 0.1% to 25%, alternatively 0.1% to 15%, alternatively 0.5% to 15%, alternatively 0.5% to 10%, alternatively 0.1% to 5%.

Starting Material D)

Starting material D) in the adhesive composition described above is a free radical initiator. The free radical initiator may comprise an azo compound or an organic peroxide compound. Suitable azo compounds include azobenzene, azobenzene-p-sulfonic acid, azobisdimethylvaleronitrile, azobisisobutyronitrile, and a combination thereof. Suitable organic peroxide compounds include dialkyl peroxides, diaryl peroxides, diacyl peroxides, alkyl hydroperoxides, and aryl hydroperoxides. Specific organic peroxide compounds are exemplified by benzoyl peroxide; dibenzoyl peroxide; 4-monochlorobenzoyl peroxide; dicumyl peroxide; tert-butylperoxybenzoate; tert-butyl cumyl peroxide; tert-butyloxide 2,5-dimethyl-2,5-di-tert-butylperoxyhexane; 2,4-dichlorobenzoyl peroxide; di-tert-butylperoxy-diisopropyl benzene; 1,1-bis(tert-butylperoxy)-3,3,5-trimethylcyclohexane; 2,5-di-tert-butylperoxyhexane-3,2,5-dimethyl-2,5-bis(tert-butylperoxy) hexane; cumyl-tert-butyl peroxide; or combinations of two or more thereof.

The amount of free radical initiator added to the adhesive composition depends on various factors including the type and amount of condensation reaction catalyst selected and the selection of other starting materials in the adhesive composition, however, the free radical initiator may be present in an amount of 0.1% to 5%, alternatively 0.2% to 3%, alternatively 0.5% to 2%, based on the combined weights of all starting materials in the adhesive composition.

Additional Starting Materials

The adhesive composition described above may further comprise one or more additional starting materials (distinct from and added in addition to starting materials A), B), C) and D) described above). The additional starting materials selected from the group consisting of E) a dual cure compound, F) an adhesion promoter, G) a corrosion inhibitor, H) a rheology modifier, I) a drying agent, J) a crosslinker, K) a filler, L) a spacer, M) an acid scavenger, N) a silanol functional polydiorganosiloxane, O) a fluorescent optical brightener, P) a chain transfer agent, Q) a (meth)acrylate monomer, R) a poly-alkoxy terminated polydiorganosiloxane, S) a colorant, and two or more of E), F), G), H), I), J), K), L), M), N), O), P), Q), R), and S).

Starting Material E)

The adhesive composition described above may optionally further comprise starting material E) a dual cure compound. The dual cure compound is an organosilicon compound having, per molecule, at least one hydrolyzable group and at least one free radical reactive group. The organosilicon compound for starting material E) may comprise a silane of formula $R^1_{mm}R_{nn}SiX_{(4-mm-nn)}$, where R and $R^1$ are as described above, X is a hydrolysable group, subscript mm is 1 to 2, subscript nn is 0 to 2, and a quantity (mm+nn) is 2 to 3.

Each X independently represents a hydrolyzable group, which may be selected from an acetamido group, an acyloxy group such as acetoxy, an alkoxy group, an amido group, an amino group, an aminoxy group, an oximo group, a ketoximo group, and a methylacetamido group. X is not a hydroxyl group. Alternatively, each X may be an acetoxy group or an alkoxy group. Alternatively, each X is an alkoxy group, such as methoxy, ethoxy, propoxy or butoxy; alternatively methoxy.

Alternatively, the organosilicon compound for starting material E) may comprise a polyorganosiloxane of unit formula:
$(X_{mm}R_{(3-mm)}SiO_{1/2})_{oo}(R^1R_2SiO_{1/2})_{pp}(R_2SiO_{2/2})_{qq}$
$(RXSiO_{2/2})_{rr}(R^1RSiO_{2/2})_{ss}(R^1SiO_{3/2})_{ww}(RSiO_{3/2})_{tt}$
$(SiO_{4/2})_{uu}$, where R, $R^1$, and X and subscript mm are as described above, subscript oo≥0, subscript pp≥0, subscript qq≥0, subscript rr≥0, subscript ss≥0, subscript ww≥0, subscript tt≥0, and subscript uu≥0, with the provisos that a quantity (oo+rr)≥1, a quantity (pp+ss+ww)≥1, and a quantity (oo+pp+qq+rr+ss+ww+tt+uu)>2. Alternatively, subscript oo is 0 to 100, alternatively 0 to 50, alternatively 0 to 20, alternatively 0 to 10, alternatively, 1 to 50, alternatively, 1 to 20, and alternatively 1 to 10. Alternatively, subscript pp may be 0 to 100, alternatively 0 to 50, alternatively 0 to 20, alternatively 0 to 10, alternatively 1 to 50, alternatively 1 to 20, and alternatively 1 to 10. Alternatively, subscript qq is 0 to 1,000, alternatively 0 to 500, alternatively 0 to 200, alternatively 0 to 100, alternatively 1 to 500, alternatively 1 to 200, and alternatively 1 to 100. Alternatively, subscript rr is 0 to 100, alternatively 0 to 50, alternatively 0 to 20; alternatively 0 to 10, alternatively 1 to 50, alternatively 1 to 20, and alternatively 1 to 10. Alternatively, subscript ss is 0 to 100, alternatively 0 to 50, alternatively 0 to 20, alternatively 0 to 10, alternatively 1 to 50, alternatively 1 to 20, and alternatively 1 to 10. Alternatively, subscript ww is 0 to 100, alternatively 0 to 50, alternatively 0 to 20, alternatively 0 to 10, alternatively 1 to 50, alternatively 1 to 20, and alternatively 1 to 10. Alternatively, subscript tt is 0 to 1,000, alternatively 0 to 500, alternatively 0 to 200; alternatively 0 to 100, alternatively 1 to 500, alternatively 1 to 200, and alternatively 1 to 100. Alternatively, subscript uu is 0 to 1,000, alternatively 0 to 500, alternatively 0 to 200, alternatively 0 to 100, alternatively 1 to 500, alternatively 1 to 200, and alternatively 1 to 100.

Examples of starting material E) include silanes, such as methacryloxypropyltrimethoxysilane, acryloxypropyltrimethoxysilane, acryloxypropyltriethoxysilane, methacryloxypropyltriethoxysilane, methacryloxypropylmethyldimethoxysilane, acryloxypropylmethyldimethoxysilane, acryloxypropyldimethylmethoxysilane, and methacryloxypropyldimethylmethoxysilane.

The amount of dual cure compound in the adhesive composition depends on various factors including the selection of the other starting materials, whether any additional starting materials are added, and the end use of the composition. However, the dual cure compound may be present in an amount ranging from 0.01% to 25% based on combined weights of all starting materials in the adhesive composition. Alternatively, the dual cure compound may be present in an amount of 0.1% to 25%, alternatively 0.1% to 15%, alternatively 0.5% to 15%, alternatively 0.5% to 10%, alternatively 0.1% to 5%.

Starting Material F)

The adhesive composition described above may optionally further comprise F) an adhesion promoter. Suitable adhesion promoters may comprise a transition metal chelate, a hydrocarbonoxysilane such as an alkoxysilane, a combination of an alkoxysilane and a hydroxy-functional polyorganosiloxane, an aminofunctional silane, or a combination thereof. Adhesion promoters may comprise silanes having the formula $R^{15}_{aaa}R^{16}_{bbb}Si(OR^{17})_{4-(aaa+bbb)}$ where each $R^{15}$ is independently a monovalent organic group having at least 3 carbon atoms; $R^{16}$ contains at least one SiC bonded substituent having an adhesion-promoting group, such as amino, epoxy, mercapto or acrylate groups; each $R^{17}$ is independently a saturated hydrocarbon group such as an alkyl group of 1 to 4 carbon atoms; subscript aaa has a value ranging from 0 to 2; subscript bbb is either 1 or 2; and a quantity (aaa+bbb) is not greater than 3. Alternatively, the adhesion promoter may comprise a partial condensate of the above silane. Alternatively, the adhesion promoter may comprise a combination of an alkoxysilane and a hydroxy-functional polyorganosiloxane.

Alternatively, the adhesion promoter may comprise an unsaturated or epoxy-functional compound. The adhesion promoter may comprise an unsaturated or epoxy-functional alkoxysilane. For example, the functional alkoxysilane can have the formula $R^{18}_{ccc}Si(OR^{19})_{(4-ccc)}$, where subscript ccc is 1, 2, or 3, alternatively subscript ccc is 1. Each $R^{18}$ is independently a monovalent organic group with the proviso that at least one $R^{18}$ is an unsaturated organic group or an epoxy-functional organic group. Epoxy-functional organic groups for $R^{18}$ are exemplified by 3-glycidoxypropyl and (epoxycyclohexyl)ethyl. Unsaturated organic groups for $R^{18}$ are exemplified by 3-methacryloyloxypropyl, 3-acryloyloxypropyl, and unsaturated monovalent hydrocarbon groups such as vinyl, allyl, hexenyl, undecylenyl. Each $R^{19}$ is independently a saturated hydrocarbon group of 1 to 4 carbon atoms, alternatively 1 to 2 carbon atoms. $R^{19}$ is exemplified by methyl, ethyl, propyl, and butyl.

Examples of suitable epoxy-functional alkoxysilanes include 3-glycidoxypropyltrimethoxysilane, 3-glycidoxypropyltriethoxysilane, (epoxycyclohexyl)ethyldimethoxysilane, (epoxycyclohexyl)ethyldiethoxysilane, (epoxycyclohexyl)ethyltrimethoxysilane, (epoxycyclohexyl)ethyltriethoxysilane, and combinations thereof. Examples of suitable unsaturated alkoxysilanes include vinyltrimethoxysilane, allyltrimethoxysilane, allyltriethoxysilane, hexenyltrimethoxysilane, undecylenyltrimethoxysilane, 3-methacryloyloxypropyl trimethoxysilane, 3-methacryloyloxypropyl triethoxysilane, 3-acryloyloxypropyl trimethoxysilane, 3-acryloyloxypropyl triethoxysilane, and combinations thereof.

Alternatively, the adhesion promoter may comprise an epoxy-functional siloxane such as a reaction product of a hydroxy-terminated polyorganosiloxane with an epoxy-functional alkoxysilane, as described above, or a physical blend of the hydroxy-terminated polyorganosiloxane with the epoxy-functional alkoxysilane. The adhesion promoter may comprise a combination of an epoxy-functional alkoxysilane and an epoxy-functional siloxane. For example, the adhesion promoter is exemplified by a mixture of 3-glycidoxypropyltrimethoxysilane and a reaction product of hydroxy-terminated methylvinylsiloxane with 3-glycidoxypropyltrimethoxysilane, or a mixture of 3-glycidoxypropyltrimethoxysilane and a hydroxy-terminated methylvinylsiloxane, or a mixture of 3-glycidoxypropyltrimethoxysilane and a hydroxy-terminated methylvinyl/dimethylsiloxane copolymer.

Alternatively, the adhesion promoter may comprise an aminofunctional silane, such as an aminofunctional alkoxysilane exemplified by $H_2N(CH_2)_2Si(OCH_3)_3$, $H_2N(CH_2)_2Si(OCH_2CH_3)_3$, $H_2N(CH_2)_3Si(OCH_3)_3$, $H_2N(CH_2)_3Si(OCH_2CH_3)_3$, $CH_3NH(CH_2)_3Si(OCH_3)_3$, $CH_3NH(CH_2)_3Si(OCH_2CH_3)_3$, $CH_3NH(CH_2)_5Si(OCH_3)_3$, $CH_3NH(CH_2)_5Si(OCH_2CH_3)_3$, $H_2N(CH_2)_2NH(CH_2)_3Si(OCH_3)_3$, $H_2N(CH_2)_2NH(CH_2)_3Si(OCH_2CH_3)_3$, $CH_3NH(CH_2)_2NH(CH_2)_3Si(OCH_3)_3$, $CH_3NH(CH_2)_2NH(CH_2)_3Si(OCH_2$ CH$_3$)$_3$, C$_4$H$_9$NH(CH$_2$)$_2$NH(CH$_2$)$_3$Si(OCH$_3$)$_3$, C$_4$H$_9$NH(CH$_2$)$_2$NH(CH$_2$)$_3$Si(OCH$_2$CH$_3$)$_3$, H$_2$N(CH$_2$)$_2$SiCH$_3$(OCH$_3$)$_2$, H$_2$N(CH$_2$)$_2$SiCH$_3$(OCH$_2$CH$_3$)$_2$, H$_2$N(CH$_2$)$_3$SiCH$_3$(OCH$_3$)$_2$, H$_2$N(CH$_2$)$_3$SiCH$_3$(OCH$_2$CH$_3$)$_2$, CH$_3$NH(CH$_2$)$_3$SiCH$_3$(OCH$_3$)$_2$, CH$_3$NH(CH$_2$)$_3$SiCH$_3$(OCH$_2$CH$_3$)$_2$, CH$_3$NH(CH$_2$)$_5$SiCH$_3$(OCH$_3$)$_2$, CH$_3$NH(CH$_2$)$_5$SiCH$_3$(OCH$_2$CH$_3$)$_2$, H$_2$N(CH$_2$)$_2$NH(CH$_2$)$_3$SiCH$_3$(OCH$_3$)$_2$, H$_2$N(CH$_2$)$_2$NH(CH$_2$)$_3$SiCH$_3$(OCH$_2$CH$_3$)$_2$, CH$_3$NH(CH$_2$)$_2$NH(CH$_2$)$_3$SiCH$_3$(OCH$_3$)$_2$, CH$_3$NH(CH$_2$)$_2$NH(CH$_2$)$_3$SiCH$_3$(OCH$_2$CH$_3$)$_2$, C$_4$H$_9$NH(CH$_2$)$_2$NH(CH$_2$)$_3$SiCH$_3$(OCH$_3$)$_2$, C$_4$H$_9$NH(CH$_2$)$_2$NH(CH$_2$)$_3$SiCH$_3$(OCH$_2$CH$_3$)$_2$, and a combination thereof.

Alternatively, the adhesion promoter may comprise a transition metal chelate. Suitable transition metal chelates include titanates, zirconates such as zirconium acetylacetonate, aluminum chelates such as aluminum acetylacetonate, and combinations thereof.

Alternatively, the adhesion promoter may comprise a triazine based compound that bears functionality to react with starting material A), starting material B), or, when present, starting material E), or two or more thereof. The triazine ring can be mono-, di-, or tri-substituted and at least one of the substitute group is the functionality to react. The functionality can be a free radical reactive one or a condensation reactive one. Examples of triazine compound with free radical reactive functional groups include triallylisocyanurate, diallylpropylisocyanurate, tri-(methacryloxypropyl)isocyanurate, triallyloxytriazine, trimethacryloxytriazine, triacryloylhexahydrotriazine, and tris[2-(acryloyloxy)ethyl] isocyanurate. Examples of triazine compound with condensation reactive group include 2,4,6-tris(methyldimethoxysilyl)triazine, and tris[3-(trimethoxysilyl)propyl] isocyanurate.

The exact amount of adhesion promoter depends on various factors including the selection and amounts of other starting materials in the adhesive composition. However, the adhesion promoter, when present, may be added to the adhesive composition in an amount of 0.01 to 50 weight parts based on combined weight of all starting materials in the composition, alternatively 0.01 to 10 weight parts, and alternatively 0.01 to 5 weight parts. Examples of suitable adhesion promoters are described in U.S. Pat. No. 9,156,948.

Starting Material G)

The adhesive composition may optionally further comprise starting material G), a corrosion inhibitor. Examples of suitable corrosion inhibitors include benzotriazole, mercaptobenzothiazole, mercaptabenzotriazole and commercially available corrosion inhibitors such as 2,5-dimercapto-1,3,4-thiadiazole derivative (CUVAN® 826) and alkylthiadiazole (CUVAN® 484) from R. T. Vanderbilt of Norwalk, Conn., U.S.A. Examples of suitable corrosion inhibitors are exemplified by those described in U.S. Pat. No. 9,156,948. When present, the amount of corrosion inhibitor) may be 0.05% to 0.5% based on combined weights of all starting materials in the adhesive composition.

Starting Material H)

The adhesive composition may optionally further comprise up to 5%, alternatively 1% to 2% based on combined weights of all starting materials in the composition, of starting material H) a rheology modifier. Rheology modifiers are commercially available. Examples of suitable rheology modifiers include polyamides, hydrogenated castor oil derivatives, metal soaps, microcrystalline waxes, and combinations thereof. Examples of suitable rheology modifiers are exemplified by those described in U.S. Pat. No. 9,156,948. The amount of rheology modifier depends on various factors including the specific rheology modifier selected and the selections of the other starting materials used in the composition. However, the amount of rheology modifier may be 0 parts to 20 parts, alternatively 1 part to 15 parts, and alternatively 1 part to 5 parts based on combined weights of all starting materials in the composition.

Starting Material I)

The composition described above may optionally further comprise starting material I) a drying agent. The drying agent binds water from various sources. For example, the drying agent may bind by-products of the condensation reaction, such as water and alcohols. Examples of suitable drying agents are disclosed, for example, in U.S. Pat. No. 9,156,948. Examples of suitable adsorbents for the drying agent may be inorganic particulates, e.g., zeolites such as chabasite, mordenite, and analcite; molecular sieves such as alkali metal alumino silicates, silica gel, silica-magnesia gel, activated carbon, activated alumina, calcium oxide, and combinations thereof. The adsorbent may have a particle size of 10 micrometers or less. The adsorbent may have average pore size sufficient to adsorb water and alcohols, for example 10 Å (Angstroms) or less.

Alternatively, the drying agent may bind the water and/or other by-products by chemical means. An amount of a silane crosslinker added to the composition (in addition to any silane crosslinker used as starting material J)) may function as a chemical drying agent. Without wishing to be bound by theory, it is thought that the chemical drying agent may be added to the dry part of a multiple part composition to keep the composition free from water after the parts of the composition are mixed together. For example, alkoxysilanes suitable as drying agents include vinyltrimethoxysilane, vinyltriethoxysilane, isobutyltrimethoxysilane, and combinations thereof. The amount of drying agent depends on the specific drying agent selected. However, when starting material I) is a chemical drying agent, the amount may range from 0 parts to 15 parts, alternatively 0 parts to 10 parts, alternatively 0 parts to 5 parts, alternatively 0.1 parts to 0.5 parts, based on combined weights of all starting materials in the composition.

Starting Material J)

The composition described above may optionally further comprise starting material J) a crosslinker. The crosslinker may comprise a silane crosslinker having hydrolyzable groups or partial or full hydrolysis products thereof. The crosslinker has an average, per molecule, of greater than two substituents reactive with the hydrolyzable groups on starting material B). Examples of suitable silane crosslinkers for starting material J) may have the general formula $R^{20}{}_{ddd}Si(R^{21})_{(4-ddd)}$, where each $R^{20}$ is independently a monovalent hydrocarbon group such as an alkyl group; each $R^{21}$ is a hydrolyzable substituent, which may be a group the same as X described above. Alternatively, each $R^{21}$ may be, for example, a hydrogen atom, a halogen atom, an acetamido group, an acyloxy group such as acetoxy, an alkoxy group, an amido group, an amino group, an aminoxy group, a hydroxyl group, an oximo group, a ketoximo group, or a methylacetamido group; and each instance of subscript ii may be 0, 1, 2, or 3. For the silane crosslinker, subscript ii has an average value greater than 2. Alternatively, subscript ddd may have a value ranging from 3 to 4. Alternatively, each R21 may be independently selected from hydroxyl, alkoxy, acetoxy, amide, or oxime. Alternatively, the silane crosslinker may be selected from an acyloxysilane, an alkoxysilane, a ketoximosilane, and an oximosilane.

The silane crosslinker may comprise an alkoxysilane exemplified by a dialkoxysilane, such as a dialkyldialkoxysilane; a trialkoxysilane, such as an alkyltrialkoxysilane; a tetraalkoxysilane; or partial or full hydrolysis products thereof, or another combination thereof. Examples of suitable trialkoxysilanes include methyltrimethoxysilane, methyltriethoxysilane, ethyltrimethoxysilane, ethyltriethoxysilane, isobutyltrimethoxysilane, isobutyltriethoxysilane, and a combination thereof, and alternatively methyltrimethoxysilane. Examples of suitable tetraalkoxysilanes include tetraethoxysilane. Alternatively, the silane crosslinker may comprise an acyloxysilane, such as an acetoxysilane. Acetoxysilanes include a tetraacetoxysilane, an organotriacetoxysilane, a diorganodiacetoxysilane, or a combination thereof. Exemplary acetoxysilanes include, but are not limited to, tetraacetoxysilane, methyltriacetoxysilane, ethyltriacetoxysilane, vinyltriacetoxysilane, propyltriacetoxysilane, butyltriacetoxysilane, phenyltriacetoxysilane, octyltriacetoxysilane, dimethyldiacetoxysilane, phenylmethyldiacetoxysilane, vinylmethyldiacetoxysilane, diphenyl diacetoxysilane, tetraacetoxysilane, and combinations thereof. Alternatively, the crosslinker may comprise organotriacetoxysilanes, for example mixtures comprising methyltriacetoxysilane and ethyltriacetoxysilane. Examples of silanes suitable for starting material J) containing both alkoxy and acetoxy groups that may be used in the composition include methyldiacetoxymethoxysilane, methylacetoxydimethoxysilane, vinyldiacetoxymethoxysilane, vinylacetoxydimethoxysilane, methyldiacetoxyethoxysilane, metylacetoxydiethoxysilane, and combinations thereof.

Alternatively, the crosslinker may comprise an aminofunctional such as $H_2N(CH_2)_2Si(OCH_3)_3$, $H_2N(CH_2)_2Si(OCH_2CH_3)_3$, $H_2N(CH_2)_3Si(OCH_3)_3$, $H_2N(CH_2)_3Si(OCH_2CH_3)_3$, $CH_3NH(CH_2)_3Si(OCH_3)_3$, $CH_3NH(CH_2)_3Si(OCH_2CH_3)_3$, $CH_3NH(CH_2)_5Si(OCH_3)_3$, $CH_3NH(CH_2)_5Si(OCH_2CH_3)_3$, $H_2N(CH_2)_2NH(CH_2)_3Si(OCH_3)_3$, $H_2N(CH_2)_2NH(CH_2)_3Si(OCH_2CH_3)_3$, $CH_3NH(CH_2)_2NH(CH_2)_3Si(OCH_3)_3$, $CH_3NH(CH_2)_2NH(CH_2)_3Si(OCH_2CH_3)_3$, $C_4H_9NH(CH_2)_2NH(CH_2)_3Si(OCH_3)_3$, $C_4H_9NH(CH_2)_2NH(CH_2)_3Si(OCH_2CH_3)_3$, $H_2N(CH_2)_2SiCH_3(OCH_3)_2$, $H_2N(CH_2)_2SiCH_3(OCH_2CH_3)_2$, $H_2N(CH_2)_3SiCH_3(OCH_3)_2$, $H_2N(CH_2)_3SiCH_3(OCH_2CH_3)_2$, $CH_3NH(CH_2)_3SiCH_3(OCH_3)_2$, $CH_3NH(CH_2)_3SiCH_3(OCH_2CH_3)_2$, $CH_3NH(CH_2)_5SiCH_3(OCH_3)_2$, $CH_3NH(CH_2)_5SiCH_3(OCH_2CH_3)_2$, $H_2N(CH_2)_2NH(CH_2)_3SiCH_3(OCH_3)_2$, $H_2N(CH_2)_2NH(CH_2)_3SiCH_3(OCH_2CH_3)_2$, $CH_3NH(CH_2)_2NH(CH_2)_3SiCH_3(OCH_3)_2$, $CH_3NH(CH_2)_2NH(CH_2)_3SiCH_3(OCH_2CH_3)_2$, $C_4H_9NH(CH_2)_2NH(CH_2)_3SiCH_3(OCH_3)_2$, $C_4H_9NH(CH_2)_2NH(CH_2)_3SiCH_3(OCH_2CH_3)_2$, or a combination thereof, and a combination thereof. Examples of suitable silane crosslinkers are disclosed in U.S. Pat. No. 9,156,948.

Alternatively, the crosslinker may comprise a multifunctional (meth)acrylate crosslinker, such as a di(meth)acrylate exemplified Such crosslinkers are exemplified by ethylene glycol dimethacrylate, ethylene glycol diacrylate, triethylene glycol dimethacrylate, diethylene glycol bismethacryloxy carbonate, polyethylene glycol diacrylate, tetraethylene glycol dimethacrylate, diglycerol diacrylate, diethylene glycol dimethacrylate, pentaerythritol triacrylate, trimethylolpropane triglycidyl ether, trimethylolpropane tris(2-methyl-1-aziridine)propionate, trimethylol propane trimethacrylate, acrylate tipped urethane containing prepolymers, polyether diacrylates, and dimethacrylates, and combinations of two or more thereof. Suitable multifunctional (meth)acrylate crosslinkers are disclosed, for example, in U.S. Pat. No. 8,304,543 at col. 11 lines 46-65.

When present, the crosslinker may be added in an amount ranging from 0.1% to 10% based on the combined weights of all starting materials in the adhesive composition.

Starting Material K)

The composition described above may optionally further comprise K) a filler. The filler may comprise a reinforcing filler, an extending filler, a conductive filler, or a combination thereof. For example, the composition may optionally further comprise ingredient (K1), a reinforcing filler, which when present may be added in an amount of 0.1% to 95%, alternatively 1% to 60%, based on combined weights of all starting materials in the adhesive composition. The exact amount of ingredient (K1) depends on various factors including the form of the reaction product of the composition and whether any other fillers are added. Examples of suitable reinforcing fillers include reinforcing silica fillers such as fume silica, silica aerogel, silica xerogel, and precipitated silica. Fumed silicas are known in the art and commercially available; e.g., fumed silica sold under the name CAB-O-SIL by Cabot Corporation of Massachusetts, U.S.A.

The composition may optionally further comprise ingredient (K2) an extending filler in an amount ranging from 0.1% to 95%, alternatively 1% to 60%, and alternatively 1% to 20%, based on combined weights of all starting materials in the adhesive composition. Examples of extending fillers include crushed quartz, aluminium oxide, magnesium oxide, calcium carbonate such as precipitated calcium carbonate, zinc oxide, talc, diatomaceous earth, iron oxide, clays, mica, chalk, titanium dioxide, zirconia, sand, carbon black, graphite, or a combination thereof. Extending fillers are known in the art and commercially available; such as a ground silica sold under the name MIN-U-SIL by U.S. Silica of Berkeley Springs, W. Va. Suitable precipitated calcium carbonates included Winnofil® SPM from Solvay and Ultrapflex® and Ultrapflex® 100 from SMI. Examples of suitable fillers are disclosed in U.S. Pat. No. 9,156,948.

Starting Material L)

The adhesive composition described above may optionally further comprise L) a spacer. Spacers can comprise organic particles, inorganic particles, or a combination thereof. Spacers can be thermally conductive, electrically conductive, or both. Spacers can have a desired particle size, for example, particle size may range from 25 micrometers (μm) to 125 μm. Spacers can comprise monodisperse beads, such as glass or polymer (e.g., polystyrene) beads. Spacers can comprise thermally conductive fillers such as alumina, aluminum nitride, atomized metal powders, boron nitride, copper, and silver. The amount of spacer depends on various factors including the particle size distribution, pressure to be applied during use of the composition prepared by mixing the parts, or the cured product prepared therefrom, temperature during use, and desired thickness of the mixed composition or the cured product prepared therefrom. However, the composition may contain an amount of spacer of 0.05% to 2%, alternatively 0.1% to 1% based on combined weights of all starting materials in the composition.

Starting Material M)

The composition described above may optionally further comprise M) an acid scavenger. Suitable acid scavengers include various inorganic and organic compounds that are basic in nature, such as magnesium oxide, calcium oxide, and combinations thereof. The composition may comprise 0% to 10% of acid scavenger based on the combined weights of all starting materials in the composition.

Starting Material N)

The composition described above may optionally further comprise N) a silanol functional polydiorganosiloxane. Starting material N) may comprise a polydiorganosiloxane of the formula $HOR_2SiO(R_2SiO)_{eee}((HO)RSiO)_{fff}SiR_2OH$, the formula $R_3SiO(R_2SiO)_{ggg}((HO)RSiO)_{hhh}SiR_3$, or a combination thereof, where R is as described above. Subscript eee may be 0 or a positive number. Alternatively, subscript eee has an average value of at least 2. Alternatively subscript eee may have a value ranging from 2 to 2000. Subscript fff may be 0 or a positive number. Alternatively, subscript fff may have an average value ranging from 0 to 2000. Subscript ggg may be 0 or a positive number. Alternatively, subscript ggg may have an average value ranging from 0 to 2000. Subscript hhh has an average value of at least 2. Alternatively subscript hhh may have an average value ranging from 2 to 2000.

Starting material N) may comprise a polydiorganosiloxane such as
i) hydroxy-terminated polydimethylsiloxane,
ii) hydroxy-terminated poly(dimethylsiloxane/methylphenylsiloxane),
iii) trimethylsiloxy-terminated poly(dimethylsiloxane/methylhydroxysiloxane), and
iv) a combination of two or more of i), ii) and iii).

Hydroxyl-endblocked polydiorganosiloxanes suitable for use as starting material N) may be prepared by methods known in the art, such as hydrolysis and condensation of the corresponding organohalosilanes or equilibration of cyclic polydiorganosiloxanes. When added to the adhesive composition, starting material N) may be present in an amount of 0.1% to 20%, alternatively 0.1% to 10%, and alternatively 0.1% to 5% based on combined weights of all starting materials in the adhesive composition.

Starting Material O)

The adhesive composition described above may optionally further comprise starting material O), an optical brightener. Suitable optical brighteners are commercially available, such as 2,5-thiophenediylbis(5-tert-butyl-1,3-benzoxazole), commercially available as TINOPAL OB. When added to the composition, the optical brightener may be present in an amount of 0.1% to 2% based on combined weights of all starting materials in the adhesive composition.

Starting Material P)

The adhesive composition described above may optionally further comprise a P) chain transfer agent. When added to the adhesive composition, the chain transfer agent may be present in an amount of 0.01% to 5%, alternatively 0.01% to 2%, and alternatively 0.1 to 2%, based on combined weights of all starting materials in the composition.

Starting Material Q)

The adhesive composition described above may optionally further comprise starting material Q), a (meth)acrylate monomer. The (meth)acrylate monomer is exemplified by methylacrylate, butylacrylate, 2-ethylhexylacrylate, isobornylacrylate, terahydrofurfuryl acrylate, cyclohexylmethylacrylate methyl methacrylate, butylmethacrylate, 2-ethylhexylmethacrylate, isobornylmethacrylate, terahydrofurfuryl methacrylate, and cyclohexylmethylmethacrylate. When added to the adhesive composition, the (meth)acrylate monomer may be present in an amount of 0.1% to 35%, alternatively 0.1% to 25%, alternatively 0.1 to 15%, and alternatively 0.1% to 10%, based on combined weights of all starting materials in the adhesive composition.

Starting Material R)

Starting material R) is a poly-alkoxy terminated polydiorganosiloxane, in addition to any that would be prepared via preparation of starting material B), described above. Starting material R) may be a poly-alkoxy terminated polydiorganosiloxane prepared as described above for starting material B), except without including the siloxane resin. Alternatively, starting material R) may be a poly-alkoxy terminated polydiorganosiloxane prepared via a platinum catalyzed hydrosilylation reaction, as described above.

Starting Material S)

The adhesive composition described above may optionally further comprise starting material S), a colorant. The colorant may be a dye or pigment, such as carbon black.

When selecting starting materials for the adhesive composition described above, there may be overlap between types of ingredients because certain starting materials described herein may have more than one function. For example, certain alkoxysilanes may be useful as crosslinkers and/or adhesion promoters and/or drying agents. Certain particulates may be useful as fillers and spacers. When adding additional starting materials to the adhesive composition, the additional starting materials are distinct from one another.

Method for Preparing the Adhesive Composition

The adhesive composition described above may be prepared by 1) combining starting materials B) i) the organosiloxane resin and B) ii) the polydiorganosiloxane to form a resin polymer blend (RPB). Solvent may optionally be used to homogenize the RPB. One or more of the starting materials, such as the organosiloxane resin may be dissolved or dispersed in a solvent, such as benzene, toluene or xylene. Typically, the amount of solvent may be 0 to 60%, alternatively 10% to 50%, and alternatively 20% to 40% based on combined weights of all starting materials in the adhesive composition. Starting materials B) iii) and B) iv) as described above, may be combined with the RPB to form a converted RPB. The method may further comprise: 2) combining the converted RPB and starting materials A), C), and D) by any convenient means, such as mixing. One or more additional starting materials E) to S) as described above may be added during step 1), step 2) or both. The starting materials may be combined at 20° C. to 150° C. The method may further comprise heating the starting materials at a temperature of 50° C. to 150° C., alternatively 60° C. to 120° C. in step 1), step 2) or both. The pressure is not critical; the method may be performed at ambient pressure.

EXAMPLES

The following examples are intended to illustrate some embodiments of the invention, and should not be interpreted as limiting the scope of the invention set forth in the claims. The starting materials in Table 1 were used in these examples.

TABLE 1

Starting Materials

| Abbreviation | Name/Composition | Function |
| --- | --- | --- |
| Conventional ETM | Trimethoxysilylethyl tetramethyldisiloxane, branched (35%); 1-(trimethoxysilylethyl)-1,1,3,3-tetramethyldisiloxane (65%) | Endblocker (comparative) |
| Linear ETM | 1-(trimethoxysilylethyl)-1,1,3,3-tetramethyldisiloxane (>95%) | Endblocker Starting material B) iii) of the invention |
| Resin 1 | Vinylated MQ resin, vinyl = 1.9 wt %, Mw = 17,000-22,000 g/mol, silanol = 1.5 wt % | Starting material B) i) in claim 1 |
| Resin 2 | Vinylated MQ resin, vinyl = 1.8 wt %, Mw = 14,000-16,000 g/mol, silanol = 0.9 wt % | Starting material B) i) in claim 1 |
| RPB 1 | Blend of 55% PDMS 2 and 45% Resin 1 | Starting material B) i) and ii) in claim 1 |
| RPB 2 | Blend of 60% PDMS 1 and 40% Resin 2 | Starting material B) i) and ii) in claim 1 |
| RPB 3 | Blend of 65% PDMS 1 and 35% Resin 1 | Starting material B) i) and ii) in claim 1 |
| RPB 4 | Blend of 66% PDMS 3 and 34% Resin 1 | Starting material B) i) and ii) in claim 1 |
| Dow Corning Conventionally Endblocked RPB 1 | Products of the reaction of RPB 1 and Conventional ETM, production scale, | Starting material B) (comparative) |
| Converted RPB 1 | Products of the reaction of RPB 1 and Conventional ETM, laboratory scale | Starting material B) (comparative) |
| Converted RPB 2 | Products of the reaction of RPB 2 and Conventional ETM | Starting material B) (comparative) |
| Converted RPB 3 | Products of the reaction of RPB 3 and Conventional ETM | Starting material B) (comparative) |
| Converted RPB 4 | Products of the reaction of RPB 4 and Conventional ETM | Starting material B) (comparative) |
| Converted RPB 5 | Products of the reaction of RPB 1 and linear ETM | Starting material B) of the invention |
| Converted RPB 6 | Products of the reaction of RPB 2 and linear ETM | Starting material B) of the invention |
| Converted RPB 7 | Products of the reaction of RPB 3 and linear ETM | Starting material B) of the invention |
| Converted RPB 8 | Products of the reaction of RPB 4 and linear ETM | Starting material B) of the invention |
| Dumbbell Intermediate | Dumbbell polymer with polydimethylsiloxane backbone and clustered methacrylates at both ends, DP = 800-1000 | Starting material A) of the invention |

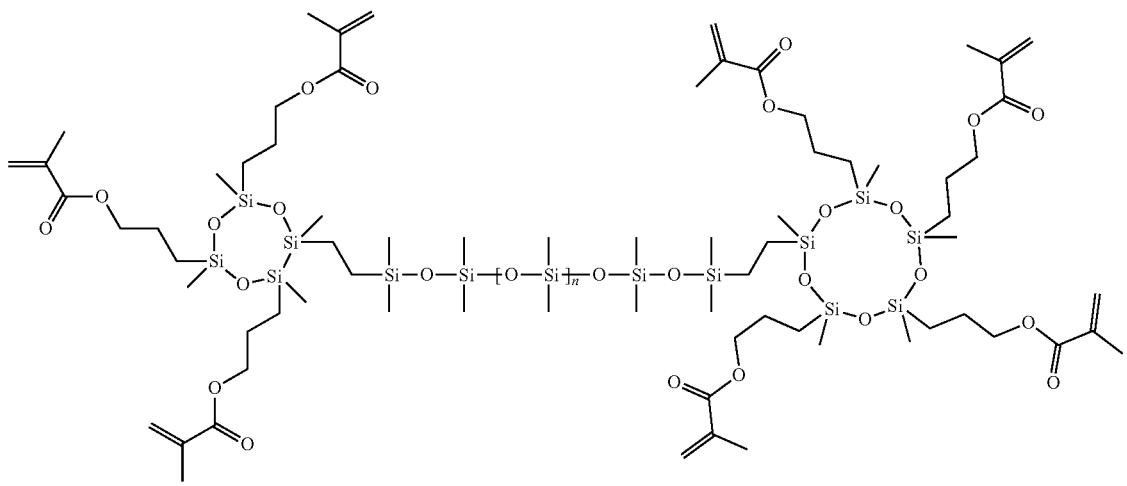

Dumbbell Intermediate

| | | |
| --- | --- | --- |
| Z-6030 | Methacryloxypropyltrimethoxysilane | Starting material E) Dual cure compound Organosilicon compound with both |

TABLE 1-continued

Starting Materials

| Abbreviation | Name/Composition | Function |
|---|---|---|
| | | hydrolysable group and free radical reactive group |
| Poly-alkoxy terminated PDMS | A reaction product of Vinyl terminated polydimethylsiloxane having DP = 400-500 and Conventional ETM | Starting material R) a poly-alkoxy terminated polydiorganosiloxane (in addition to that provided in the resin polymer blend B) |
| A186 | Beta-(3,4-Epoxycyclohexyl)ethyltrimethoxysilane | Starting material F) Adhesion promoter |
| APTMS | 3-Aminopropyltrimethoxysilane | Starting Material F) Adhesion promoter |
| IBTMS | Isobutyltrimethoxysilane | Starting Materials I) & J) Drying agent and crosslinker |
| Tinopal OB | 2,5-thiophenediylbis(5-tert-butyl-1,3-benzoxazole) | Starting material O) Fluorescent optical brightener |
| BPO paste | Benzoyl Peroxide (BPO), Perkadox L-50S-ps | Starting material D) Free radical initiator |
| TAIC | Triallylisocyanurate | Starting material F) Adhesion promoter |
| MBT | 2-mercaptobenzothiazole | Starting material G) Corrosion inhibitor |
| TNBT | Tri-n-butyl titanate | Starting material C) Condensation reaction catalyst |
| PDMS 1 | Vinyl terminated polydimethylsiloxane, DP = 400-500 | Starting material B) ii) Component of resin-polymer blend (RPB) |
| PDMS 2 | Vinyl terminated polydimethylsiloxane, DP = 600-700 | Starting material B) ii) Component of resin-polymer blend |
| PDMS 3 | Vinyl terminated polydimethylsiloxane, DP = 800-1000 | Starting material B) ii) Component of resin-polymer blend |
| Dow Corning Q2-5161 INT | 1,1,1,3,5,5,5 heptamethyltrisiloxane | Endblocker (see description for capping resin) |
| Comparative adhesive | A mixture of Dumbbell Intermediate 1, Conventionally Endblocked RPB 1, BPO, and minor ingredients | Comparative adhesive composition; commercially available electronic adhesive |

Example 1—Synthesis of the Converted Resin Polymer Blends: General Procedure In a typical synthesis, a resin-polymer blend (84.5 parts), magnesium oxide (3.57 parts), and a pigment (1.02 parts) were mixed for 10 minutes in a 2-Gal Ross mixer. To the mixture was added methyltrimethoxysilane (0.95 part) and hexamethyldisilazane (0.09 part). The mixture was further blended for 10 minutes under nitrogen protection. The temperature was raised to 60° C. and held for 30 minutes. The temperature was elevated to 120° C., and the mixture was stripped under full vacuum (1 Torr) for 60 minutes.

The mixture was cooled to 35° C. An endblocker (either XCF3-6105 or linear ETM, 5.41 parts) and 1,1,1,3,5,5,5-heptamethyltrisiloxane (4.34 parts) were added. The mixture was blended for 10 minutes under nitrogen protection. Karstedt's catalyst (0.096 part) was added. The reactants were mixed again for 10 minutes. The temperature was raised to 80° C. and held for 40 minutes. Once IR indicated the hydrosilylation was complete, the mixture was stripped at 150° C. under full vacuum (1 Torr) for 30 minutes. The product was obtained as a thick liquid.

Converted RPBs were prepared according to the procedure in Example 1 using the starting materials shown below in Table 2.

TABLE 2

| Converted RPBs | Starting RPB | Endcapper | Gelation time* (minutes) | Viscosity (Pa·s)@ 1% strain |
|---|---|---|---|---|
| Comparative, Conventionally Endblocked RPB 1 | RPB 1 | Conventional | 22.5 | 108 |
| Comparative, Converted RPB 1 | RPB 1 | Conventional | 26.7 | 74.8 |
| Comparative, Converted RPB 1 | RPB 1 | Conventional | 33.0 | 238 |
| Comparative, Converted RPB 2 | RPB 2 | Conventional | 30.1 | 34.5 |
| Comparative, Converted RPB 3 | RPB 3 | Conventional | 8.3 | 20.2 |
| Comparative, Converted RPB 4 | RPB 4 | Conventional | 121.4 | 151 |
| Converted RPB 5 | RPB 1 | Linear | 11.0 | 182 |
| Converted RPB 6 | RPB 2 | Linear | 3.8 | 34.7 |
| Converted RPB 7 | RPB 3 | Linear | 2.3 | 16.9 |
| Converted RPB 8 | RPB 4 | Linear | 49.6 | 149 |

*Gelation time is measured by an Ares G2 rheometer with parallel-plate under constant strain at 20° C. and 50% RH. The catalyst is tetra-n-butyl titanate with 1% wt loading.

Example 2—Formulation of Adhesives with the Converted RPBs

In a 10 liter Turello mixer, dumbbell intermediate (71.73 parts), the converted RPBs provided as described in Table 1, above, (19.34 parts), Poly-alkoxy terminated PDMS (0.1 part), and Tinopal OB (0.02 part) were loaded. The mixture was mixed for 10 minutes at 10° C. To the homogeneous mixture was added BPO (Perkadox L-50S-ps, 2.95 parts), Z-6030 (1.97 parts), triallyl isocyanurate (0.49 part), and a solution of 2-mercaptobenzothiazole (0.15 part) in A186 (0.59 part). The mixture was mixed again for 10 minutes at 10° C. Solutions of tri-n-butyl titanate (0.61 part) in IBTMS (1.85 parts) and APTMS (0.11 part) in IBTMS (0.11 part) were added. The preparation was mixed again for 10 minutes at 10° C. The final product was degassed at 10° C. at 200 Torr of vacuum for 30 minutes.

Adhesive compositions prepared according to the procedure in Example 2 are summarized in Table 3.

TABLE 3

| | Adhesive | Converted RPBs |
|---|---|---|
| Comparative, plant-made | Comparative Adhesive | Conventionally Endblocked RPB 1 |
| Comparative, lab-made | Comparative Adhesive | Converted RPB 1 |
| | New adhesive I | Converted RPB 2 |
| | New adhesive II | Converted RPB 6 |

Example 3—Cure of the Adhesive Films

Thin films of the adhesives were made by a draw-down bar with 50 mil gap (1.27 mm) on aluminum Q panels (3.5×10 inches). The films were cured in an oven in air at 100° C. for an hour. The films were allowed to cool to room temperature for 15 minutes, before their surface wetness was measured via an Impact test.

Example 4—Impact Test

The impact test was carried out on a drop impact tester (Qualtech Products). A pre-weighed filter paper (Gilman, quantitative, Grade 2) was place on a cured adhesive film (Thickness: 50 mil, 1.27 mm) on aluminum Q-panel (3.5× 10"). A steel block (0.3 Kg) was dropped from a height of 30 cm onto a cylindrical metal bar which makes an imprint on the filter paper. The drop was repeated a couple of times at different areas of the filter paper. The filter paper was carefully peeled off the specimen and weighed. The difference before and after the impact in milligrams is referred as the surface wetness of the sample.

Example 5—Cure Speed of the Converted RPBs

Cure speed tests were carried out at 20° C. and 50% relative humidity (RH) in air. The converted RPBs prepared as described above were well blended with 1% wt tri-n-butyltitanate immediately prior to the tests. The results indicated that the gelation times of the RPBs treated with the Linear Endblocker in general were much shorter than those treated with Conventional Endblocker. In the case of RPB 2, almost an order of magnitude reduction in the gelation time was observed when the RPB was treated with the Linear Endblocker. Other properties of the Endblocked RPBs, including viscosity, molecular weight distribution, and alkoxy contents, were largely similar, regardless of the endblocker used.

Example 6—Efficacy of the Converted RPBs in Adhesive Formulations

Dumbbell intermediate 1 was chosen to test the efficacy of the new converted RPBs on the surface wetness control. Commercially available EA-7100 adhesive showed an initial surface wetness of 24 mg, and dried completely in about 305 hours. The initial surface wetness of the adhesive containing converted RPB 2 (endblocked with Conventional Endblocker) decreased to 16.1 mg, with the drying time reduced to 170 hours. In comparison, converted RPB 6 (endblocked with Linear Endblocker) was able to reduce the initial surface wetness of the adhesive to 9.3 mg, and the drying time to 60 hours.

The surface wetness data of the adhesives in prepared as described above in Example 2 and Table 3 is summarized in Table 4.

TABLE 4

| EA-7100 (prepared on commercial scale) | | EA-7100 (prepared on a lab scale) | | New Adhesive I | | New Adhesive II | |
|---|---|---|---|---|---|---|---|
| Time Hours | Average Wetness mg | Time Hours | Average Wetness mg | Time Hours | Average Wetness mg | Time Hours | Average Wetness mg |
| 0 | 24.10 | 0 | 19.08 | 0 | 16.10 | 0 | 9.30 |
| 24 | 12.80 | 2 | 17.70 | 2 | 13.50 | 2 | 8.20 |
| 48 | 8.70 | 4 | 15.85 | 4 | 12.60 | 4 | 6.83 |
| 72 | 6.90 | 6 | 15.15 | 6 | 10.80 | 6 | 6.07 |
| 120 | 4.05 | 20 | 10.25 | 20 | 6.30 | 20 | 2.67 |
| 148 | 2.60 | 28 | 8.48 | 28 | 5.30 | 28 | 2.57 |
| 170 | 1.60 | 52 | 4.25 | 52 | 2.70 | 52 | 0.40 |
| 194 | 0.90 | 97.3 | 1.25 | 97.3 | 0.53 | 60 | 0 |
| 216 | 0.42 | 172 | 0.25 | 172 | 0 | | |
| 240 | 0.44 | 196 | 0.03 | | | | |
| 284 | 0.15 | | | | | | |
| 305 | 0.02 | | | | | | |

INDUSTRIAL APPLICABILITY

These examples show that the adhesive compositions described herein have faster cure time (as shown by decreasing gelation time) and improved surface cure (as shown by decrease in surface wetness) under the conditions tested as described above.

Definitions and Usage of Terms

All amounts, ratios, and percentages are by weight unless otherwise indicated. The articles 'a', 'an', and 'the' each refer to one or more, unless otherwise indicated. The disclosure of ranges includes the range itself and also anything subsumed therein, as well as endpoints. For example, disclosure of a range of 2.0 to 4.0 includes not only the range of 2.0 to 4.0, but also 2.1, 2.3, 3.4, 3.5, and 4.0 individually, as well as any other number subsumed in the range. Furthermore, disclosure of a range of, for example, 2.0 to 4.0 includes the subsets of, for example, 2.1 to 3.5, 2.3 to 3.4, 2.6 to 3.7, and 3.8 to 4.0, as well as any other subset subsumed in the range. Similarly, the disclosure of Markush groups includes the entire group and also any individual members and subgroups subsumed therein. For example, disclosure of the Markush group a hydrogen atom, an alkyl group, an alkenyl group, or an aryl group, includes the member alkyl individually; the subgroup alkyl and aryl; and any other individual member and subgroup subsumed therein.

"Alkyl" means a saturated monovalent hydrocarbon group. Alkyl is exemplified by, but not limited to, methyl, ethyl, propyl (e.g., iso-propyl and/or n-propyl), butyl (e.g., isobutyl, n-butyl, tert-butyl, and/or sec-butyl), pentyl (e.g., isopentyl, neopentyl, and/or tert-pentyl); hexyl, heptyl, octyl, nonyl, and decyl, as well as branched saturated monovalent hydrocarbon groups of 6 or more carbon atoms.

"Alkenyl" means a monovalent hydrocarbon group containing a double bond. Alkenyl groups are exemplified by, but not limited to, ethenyl, propenyl (e.g., iso-propenyl and/or n-propenyl), butenyl (e.g., isobutenyl, n-butenyl, tert-butenyl, and/or sec-butenyl), pentenyl (e.g., isopentenyl, n-pentenyl, and/or tert-pentenyl), hexenyl, heptenyl, octenyl, nonenyl, and decenyl, as well as such branched groups of 6 or more carbon atoms.

"Alkynyl" means a monovalent hydrocarbon group containing a triple bond. Alkynyl groups are exemplified by, but not limited to, ethynyl, propynyl (e.g., iso-propynyl and/or n-propynyl), butynyl (e.g., isobutynyl, n-butynyl, tert-butynyl, and/or sec-butynyl), pentynyl (e.g., isopentynyl, n-pentynyl, and/or tert-pentynyl), hexynyl, heptynyl, octynyl, nonynyl, and decynyl, as well as such branched groups of 6 or more carbon atoms.

"Aryl" means a cyclic, fully unsaturated, hydrocarbon group. Aryl is exemplified by, but not limited to, cyclopentadienyl, phenyl, anthracenyl, and naphthyl. Monocyclic aryl groups may have 5 to 9 carbon atoms, alternatively 6 to 7 carbon atoms, and alternatively 5 to 6 carbon atoms. Polycyclic aryl groups may have 10 to 18 carbon atoms, alternatively 10 to 14 carbon atoms, and alternatively 12 to 14 carbon atoms.

"Aralkyl" means an alkyl group having a pendant and/or terminal aryl group or an aryl group having a pendant alkyl group. Exemplary aralkyl groups include tolyl, xylyl, benzyl, phenylethyl, phenyl propyl, and phenyl butyl.

"Carbocycle" and "carbocyclic" each mean a hydrocarbon ring. Carbocycles may be monocyclic or alternatively may be fused, bridged, or spiro polycyclic rings. Monocyclic carbocycles may have 3 to 9 carbon atoms, alternatively 4 to 7 carbon atoms, and alternatively 5 to 6 carbon atoms. Polycyclic carbocycles may have 7 to 18 carbon atoms, alternatively 7 to 14 carbon atoms, and alternatively 9 to 10 carbon atoms. Carbocycles may be saturated or partially unsaturated.

"Cycloalkyl" means saturated carbocycle. Monocyclic cycloalkyl groups are exemplified by cyclobutyl, cyclopentyl, and cyclohexyl.

Collectively, the term "monovalent hydrocarbon group" includes alkyl, alkenyl, aryl, aralkyl, and carbocyclic groups, as defined above.

"Divalent hydrocarbon group" includes alkylene groups such as ethylene, propylene (including isopropylene and n-propylene), and butylene (including n-butylene, t-butylene and isobutylene); and pentylene, hexylene, heptylene, octylene, and branched and linear isomers thereof; arylene groups such as phenylene; and alkaralkylene groups such as:

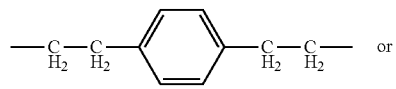 or

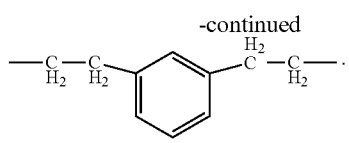.

Alternatively, each divalent hydrocarbon group may be ethylene, propylene, butylene or hexylene. Alternatively, each divalent hydrocarbon group may be ethylene or propylene.

"Halogenated hydrocarbon" means a hydrocarbon group as defined above, but where one or more hydrogen atoms bonded to a carbon atom have been formally replaced with a halogen atom. For example, monovalent halogenated hydrocarbon groups can be any one of alkyl, alkenyl, aryl, aralkyl, and carbocyclic groups in which one or more hydrogen atoms bonded to a carbon atom have been replaced with a halogen atom. Monovalent halogenated hydrocarbon groups include haloalkyl groups, halogenated carbocyclic groups, and haloalkenyl groups. Halogenated alkyl groups include fluorinated alkyl groups such as trifluoromethyl ($CF_3$), fluoromethyl, trifluoroethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl; and chlorinated alkyl groups such as chloromethyl and 3-chloropropyl. Halogenated carbocyclic groups include fluorinated cycloalkyl groups such as 2,2-difluorocyclopropyl, 2,3-difluorocyclobutyl, 3,4-difluorocyclohexyl, and 3,4-difluoro-5-methylcycloheptyl; and chlorinated cycloalkyl groups such as 2,2-dichlorocyclopropyl, 2,3-dichlorocyclopentyl. Halogenated alkenyl groups include chloro allyl.

The invention claimed is:
1. An adhesive composition comprising:
A) a poly(meth)acrylate clustered functional polyorganosiloxane comprising units of formulae:
$(R_2R^1SiO_{1/2})_{aa}(RR^1SiO_{2/2})_{bb}(R_2SiO_{2/2})_{cc}(RSiO_{3/2})_{dd}$
$(RSiO_{3/2})_{dd}(SiO_{4/2})_{ee}((R_{ff})O_{(3-ff)/2}SiD^1SiR_{ff}O_{(3-ff)/2})_{gg}$,
where each $D^1$ independently represents a divalent hydrocarbon group of 2 to 18 carbon atoms; each R independently represents a monovalent hydrocarbon group of 1 to 18 carbon atoms or a monovalent halogenated hydrocarbon group of 1 to 18 carbon atoms, each $R^1$ independently represents a methacryl-functional alkyl group or an acryl-functional alkyl group, subscript aa≥0, subscript bb≥0, a quantity (aa+bb)≥4, subscript cc>0, subscript dd≥0, subscript ee≥0, subscript ff is 0, 1, or 2, subscript gg≥2;
B) a poly-alkoxy endblocked resin-polymer blend comprising a reaction product of
i) a siloxane resin comprising units of formulae $(R^{2'}_3SiO_{1/2})$ and $(SiO_{4/2})$, where each $R^{2'}$ is independently a monovalent hydrocarbon group, with the proviso that at least one $R^{2'}$ per molecule has terminal aliphatic unsaturation, where the siloxane resin has a molar ratio of $(R_{2'3}SiO_{1/2})$ units to $(SiO_{4/2})$ units ranging from 0.5:1 to 1.5:1,
ii) a polydiorganosiloxane comprising units of formulae $(R^{2'}_3SiO_{1/2})_{ii}$ and $(R_2SiO_{2/2})_{hh}$, where $R^{2'}$ is as described above, subscript hh is 20 to 1000 and subscript ii has an average value of 2;
iii) an alkoxy-functional organohydrogensiloxane oligomer, wherein the alkoxy-functional organohydrogensiloxane oligomer comprises one or more of formula (V)

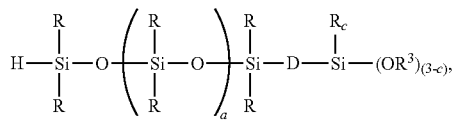

where subscript a is 0 or a positive number, subscript c is 0 or 1, each R independently represents a monovalent hydrocarbon group of 1 to 18 carbon atoms or a monovalent halogenated hydrocarbon group of 1 to 18 carbon atoms, each $R^3$ is independently a monovalent hydrocarbon group of 1 to 8 carbon atoms, and D is a divalent hydrocarbon group of 2 to 18 carbon atoms, with the proviso that >90 mol % of D are linear divalent hydrocarbon groups;

formula (VIII)

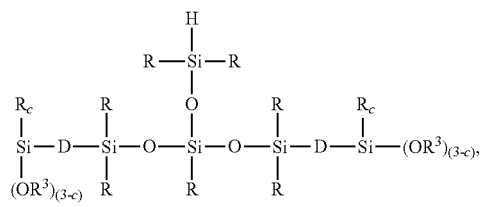

where subscript c is 0 or 1, each R independently represents a monovalent hydrocarbon group of 1 to 18 carbon atoms or a monovalent halogenated hydrocarbon group of 1 to 18 carbon atoms, each $R^3$ is independently a monovalent hydrocarbon group of 1 to 8 carbon atoms, and D is a divalent hydrocarbon group of 2 to 18 carbon atoms, with the proviso that >90 mol % of D are linear divalent hydrocarbon groups;

formula (XI)

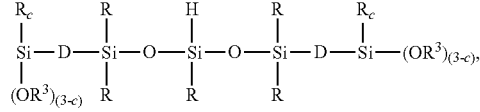

where subscript c is 0 or 1, each R independently represents a monovalent hydrocarbon group of 1 to 18 carbon atoms or a monovalent halogenated hydrocarbon group of 1 to 18 carbon atoms, each $R^3$ is independently a monovalent hydrocarbon group of 1 to 8 carbon atoms, and D is a divalent hydrocarbon group of 2 to 18 carbon atoms, with the proviso that >90 mol % of D are linear divalent hydrocarbon groups;

formula (XII)

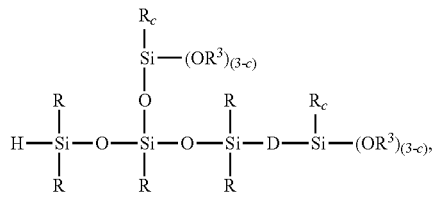

where subscript c is 0 or 1, each R independently represents a monovalent hydrocarbon group of 1 to 18 carbon atoms or a monovalent halogenated hydrocarbon group of 1 to 18 carbon atoms, each $R^3$ is independently a monovalent hydrocarbon group of 1 to 8 carbon atoms, and D is a divalent hydrocarbon group of 2 to 18 carbon atoms, with the proviso that >90 mol % of D are linear divalent hydrocarbon groups; and unit formula $(R_2SiO_{2/2})_v(RHSiO_{2/2})_t$

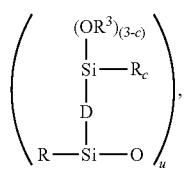

where subscript c is 0 or 1, subscript v is 0 to 14, subscript t is 0 or more, subscript u is 1 or more, t+u is at least 3, each R independently represents a monovalent hydrocarbon group of 1 to 18 carbon atoms or a monovalent halogenated hydrocarbon group of 1 to 18 carbon atoms, each $R^3$ is independently a monovalent hydrocarbon group of 1 to 8 carbon atoms, and D is a divalent hydrocarbon group of 2 to 18 carbon atoms, with the proviso that >90 mol % of D are linear divalent hydrocarbon groups; and iv) a selective hydrosilylation reaction catalyst;

C) a condensation reaction catalyst; and

D) a free radical initiator.

2. The composition of claim 1, further comprising one or more additional starting materials selected from the group consisting of E) a dual cure compound, F) an adhesion promoter, G) a corrosion inhibitor, H) a rheology modifier, I) a drying agent, J) a crosslinker, K) a filler, L) a spacer, M) an acid scavenger, N) a silanol functional polydiorganosiloxane, O) a fluorescent optical brightener, P) a chain transfer agent, Q) a (meth)acrylate monomer, R) a polyalkoxy terminated polydiorganosiloxane, S) a colorant, and two or more of E), F), G), H), I), J), K), L), M), N), O), P), Q), R) and S).

3. The adhesive composition of claim 1, where A) the poly(meth)acrylate clustered functional polyorganosiloxane has formula:

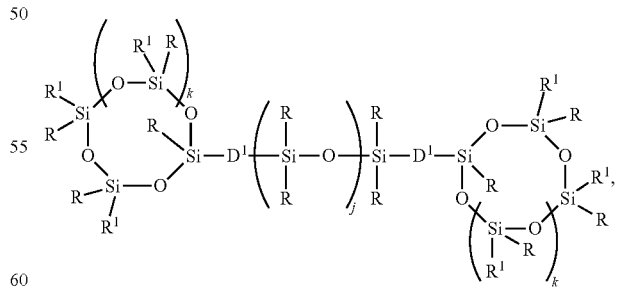

where subscript j is 0 to 2,000,000, and each subscript k is independently 1 to 12.

4. The adhesive composition of claim 1, where A) the poly(meth)acrylate clustered functional polyorganosiloxane has formula:

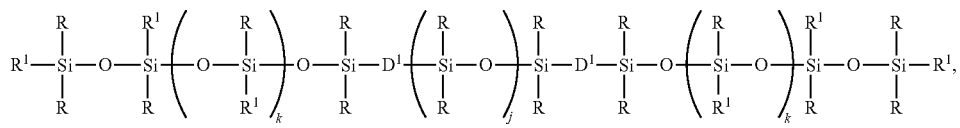

where subscript j is 0 to 2,000,000, and each subscript k is independently 1 to 12.

5. The adhesive composition of claim 1, where starting material B) i) has 3 to 30 mol % vinyl groups.

6. The adhesive composition of claim 1, where starting material B)ii) is a polydiorganosiloxane selected from the group consisting of
  i) dimethylvinylsiloxy-terminated polydimethylsiloxane,
  ii) dimethylvinylsiloxy-terminated poly(dimethylsiloxane/methylvinylsiloxane),
  iii) dimethylvinylsiloxy-terminated polymethylvinylsiloxane,
  iv) trimethylsiloxy-terminated poly(dimethylsiloxane/methylvinylsiloxane),
  v) trimethylsiloxy-terminated polymethylvinylsiloxane,
  vi) dimethylvinylsiloxy-terminated poly(dimethylsiloxane/methylvinylsiloxane),
  vii) dimethylvinylsiloxy-terminated poly(dimethylsiloxane/methylphenylsiloxane),
  viii) dimethylvinylsiloxy-terminated poly(dimethylsiloxane/diphenylsiloxane),
  ix) phenyl,methyl,vinyl-siloxy-terminated polydimethylsiloxane,
  x) dimethylhexenylsiloxy-terminated polydimethylsiloxane,
  xi) dimethylhexenylsiloxy-terminated poly(dimethylsiloxane/methylhexenylsiloxane),
  xii) dimethylhexenylsiloxy-terminated polymethylhexenylsiloxane,
  xiii) trimethylsiloxy-terminated poly(dimethylsiloxane/methylhexenylsiloxane),
  xiv) trimethylsiloxy-terminated polymethylhexenylsiloxane
  xv) dimethylhexenyl-siloxy terminated poly(dimethylsiloxane/methylhexenylsiloxane),
  xvi) dimethylvinylsiloxy-terminated poly(dimethylsiloxane/methylhexenylsiloxane)
  xvii) a combination of two or more of i), ii), iii), iv), v) vi), vii), viii) ix), x), xi), xii), xiii), xiv), xv), and xvi).

7. The adhesive composition of claim 1, where starting material B) iii) comprises an alkoxy-functional organohydrogensiloxane oligomer of formula (V):

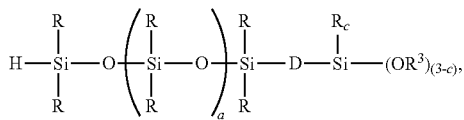

where R and subscripts a and c are as described above, D is a divalent hydrocarbon group of 2 to 18 carbon atoms, with the proviso that >90 mol % of D are linear divalent hydrocarbon groups.

8. The adhesive composition of claim 1, where starting material B) iii) comprises an alkoxy-functional organohydrogensiloxane oligomer of formula (VIII), where formula (VIII) is:

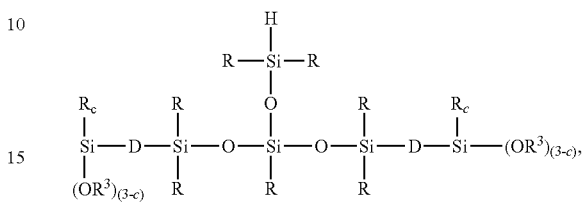

where R and subscript c are as described above, each D is independently a divalent hydrocarbon group of 2 to 18 carbon atoms, with the proviso that >90 mol % of D are linear divalent hydrocarbon groups.

9. The adhesive composition of claim 1, where starting material B) iii) comprises an alkoxy-functional organohydrogensiloxane oligomer of formula (XI), formula (XII), or a combination thereof, where formula (XI) is

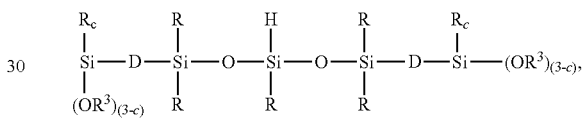

and formula (XII) is

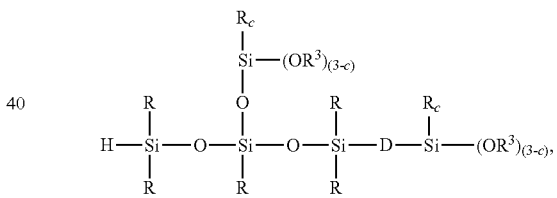

where R and subscript c are as described above.

10. The adhesive composition of claim 1, where starting material B) iv) comprises a cobalt complex of formula: $[Co(R^5)_x(R^6)_y(R^7)_w]_z$, where a quantity (w+x+y)=4; subscript z is 1 to 6; each $R^5$ is a ligand selected from carbon monoxide (CO), an isonitrile ($CNR^8$), a cyanoalkyl ($NCR^8$), $NO^+$ (called a nitrosyl or nitrosonium) or cyano ($CN^-$), where each $R^8$ is independently an alkyl group of 1 to 18 carbon atoms; with the proviso that when $R^5$ is positively charged, a negatively charged counteranion will be present, and when $R^5$ is negatively charged, a positively charged counter cation is present; each $R^6$ is independently a phosphine ligand exemplified by a diphenyl-bisphosphino alkane ligand, with the proviso that when subscript y>0, then subscript z is at least 2; and each $R^7$ is an anionic ligand.

11. The adhesive composition of claim 1, where starting material B)iv) comprises an iridium complex of formula: $[Ir(R^9)_{xx}(R^{10})_{yy}]_{zz}$, where subscript xx is 1 or 2, $R^9$ is a 1,5-cyclooctadiene ligand or a 2,5-norbornadiene ligand, subscript yy is 0, 1 or 2, $R^{10}$ is a ligand that can be activated off the complex at a temperature less than a boiling point of the organohydrogensiloxane oligomer, and subscript zz is 1 or 2.

12. The adhesive composition of claim 1, where starting material B)iv) comprises a rhodium diphosphine chelate with a formula selected from (c1) and (c2), where
- (c1) is $[(R^4(R^{11}_2P)_2)RhR^{12}]_2$, where each $R^4$ is independently a divalent hydrocarbon group, each $R^{11}$ is independently a monovalent hydrocarbon group, and each $R^{12}$ is a negatively charged ligand; and
- (c2) is $[(R^4(R^{11}P)_2)Rh(R^{14})]R^{13}$, where $R^{13}$ is an anion, and $R^{14}$ is a donor ligand.

13. The adhesive composition of claim 1, where starting material C) is selected from the group consisting of: an organotin compound and an organotitanium compound.

14. The adhesive composition of claim 1, where starting material D) is selected from an azo compound or an organic peroxide compound.

* * * * *

UNITED STATES PATENT AND TRADEMARK OFFICE
CERTIFICATE OF CORRECTION

PATENT NO. : 11,028,297 B2
APPLICATION NO. : 16/621756
DATED : June 8, 2021
INVENTOR(S) : Lu et al.

Page 1 of 1

It is certified that error appears in the above-identified patent and that said Letters Patent is hereby corrected as shown below:

In the Claims

Column 32, Claim 1, Line 42 should read: $(SiO_{4/2})_{ee}((R_{ff})O_{(3-ff)/2}SiD^1SiR_{ff}O_{(3-ff)/2})_{gg}$, Column 32, Claim 1, Line 59 should read: has a molar ratio of $(R^{2'}{}_3SiO_{1/2})$ units to $(SiO_{4/2})$ Column 33, Claim 1, Line 55 should read: formula (XII)

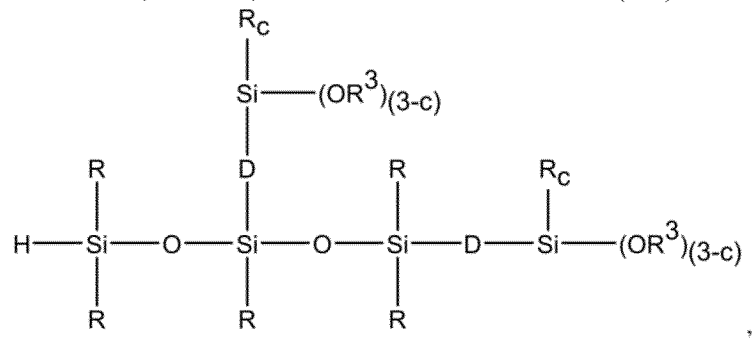

Column 36, Claim 9, Line 34 should read: and formula (XII) is

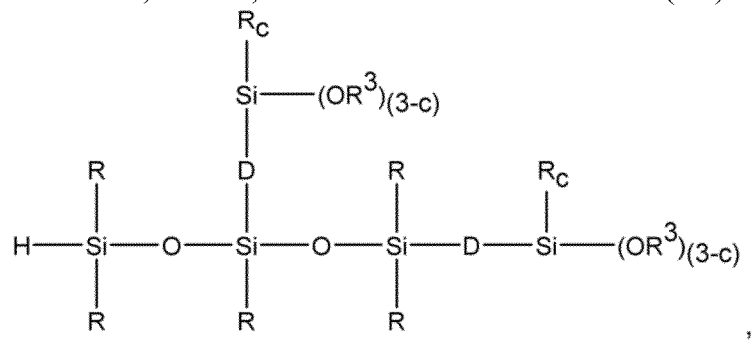

Signed and Sealed this
Third Day of August, 2021

Drew Hirshfeld
*Performing the Functions and Duties of the*
*Under Secretary of Commerce for Intellectual Property and*
*Director of the United States Patent and Trademark Office*